US012240010B2

(12) United States Patent
Kawasaki et al.

(10) Patent No.: US 12,240,010 B2
(45) Date of Patent: Mar. 4, 2025

(54) EFFECTIVE COMPONENT GENERATION DEVICE

(71) Applicant: Panasonic Intellectual Property Management Co., Ltd., Osaka (JP)

(72) Inventors: Motoji Kawasaki, Shiga (JP); Kouiti Hirai, Shiga (JP); Mikio Ito, Shiga (JP); Yutaka Uratani, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 574 days.

(21) Appl. No.: 17/618,270

(22) PCT Filed: Jun. 18, 2020

(86) PCT No.: PCT/JP2020/023999

§ 371 (c)(1),
(2) Date: Dec. 10, 2021

(87) PCT Pub. No.: WO2020/262197

PCT Pub. Date: Dec. 30, 2020

(65) Prior Publication Data

US 2022/0347701 A1 Nov. 3, 2022

(30) Foreign Application Priority Data

Jun. 26, 2019 (JP) ................................ 2019-119110
Jul. 18, 2019 (JP) ................................ 2019-133151

(51) Int. Cl.
*B05B 5/03* (2006.01)
*B05B 5/00* (2006.01)

(52) U.S. Cl.
CPC ................ *B05B 5/03* (2013.01); *B05B 5/001* (2013.01)

(58) Field of Classification Search
CPC ....... B05B 5/053; B05B 5/025; B05B 5/0255; B05B 5/16; B05B 5/03; B05B 5/001;
(Continued)

(56) References Cited

U.S. PATENT DOCUMENTS

2011/0020025 A1 1/2011 Fujii et al.
2012/0081831 A1 4/2012 Ishii et al.
(Continued)

FOREIGN PATENT DOCUMENTS

CN 102149977 A 8/2011
CN 104115351 A 10/2014
(Continued)

OTHER PUBLICATIONS

English Translation of Chinese Search Report dated Apr. 19, 2022 for the related Chinese Patent Application No. 202080044211.9.
(Continued)

*Primary Examiner* — Christopher R Dandridge
(74) *Attorney, Agent, or Firm* — Rimon P.C.

(57) ABSTRACT

Effective component generation device includes internal components, case, and air passage member. Air passage member is housed in case and surrounds discharger. Air blower of internal components generates air flow that outputs an effective component to the outside. Air passage member has upstream block and downstream block. Upstream block forms air supply passage on the upstream side. Downstream block forms air discharge passage on the downstream side. Air passage member includes air supply passage and air discharge passage in case, and forms air passage through which air flow passes. This provides effective component generation device capable of efficiently generating air flow that outputs an effective component to the outside of case.

11 Claims, 15 Drawing Sheets

(58) Field of Classification Search
CPC ......... B05B 7/0441; B05B 7/22; B05B 5/057; B05B 5/0533; B05B 5/087; B05B 5/1608; B05B 7/0075
USPC .................................................. 239/690–708
See application file for complete search history.

(56) References Cited

U.S. PATENT DOCUMENTS

| | | | | |
|---|---|---|---|---|
| 2014/0203117 | A1* | 7/2014 | Yano | B05B 7/0075 239/690 |
| 2015/0083931 | A1 | 3/2015 | Temporin et al. | |
| 2016/0213866 | A1* | 7/2016 | Tan | A61M 15/0021 |

FOREIGN PATENT DOCUMENTS

| | | | |
|---|---|---|---|
| JP | 57-172635 | A | 10/1982 |
| JP | 63-061187 | U | 4/1988 |
| JP | H03-022544 | U | 3/1991 |
| JP | 2009-231472 | A | 10/2009 |
| JP | 2010-065971 | A | 3/2010 |
| JP | 2010-286125 | A | 12/2010 |
| JP | 2011-027761 | A | 2/2011 |
| JP | 2011-183015 | A | 9/2011 |
| JP | 2013-119076 | A | 6/2013 |
| JP | 2013-218807 | A | 10/2013 |
| WO | 2010/029713 | A1 | 3/2010 |
| WO | 2011/036873 | A1 | 3/2011 |
| WO | 2013/035453 | A1 | 3/2013 |
| WO | 2013/084601 | A1 | 6/2013 |

OTHER PUBLICATIONS

The Extended European Search Report dated Jul. 15, 2022 for the related European Patent Application No. 20833587.7.
The Extended European Search Report dated Jul. 18, 2022 for the related European Patent Application No. 20832774.2.
English Translation of Chinese Search Report dated Sep. 28, 2022 for the related Chinese Patent Application No. 202080044215.7.
International Search Report and Written Opinion issued in International Patent Application No. PCT/JP2020/023999, dated Sep. 24, 2020; with partial English translation.

* cited by examiner

EFFECTIVE COMPONENT GENERATION DEVICE

CROSS-REFERENCE OF RELATED APPLICATIONS

This application is the U.S. National Phase under 35 U.S.C. § 371 of International Patent Application No. PCT/JP2020/023999, filed on Jun. 18, 2020, which in turn claims the benefit of Japanese Application No. 2019-119110, filed on Jun. 26, 2019 and Japanese Application No. 2019-133151, filed on Jul. 18, 2019, the entire disclosures of which Applications are incorporated by reference herein.

TECHNICAL FIELD

The present disclosure relates to an effective component generation device, and more particularly to an effective component generation device including a discharger that generates an effective component.

BACKGROUND ART

PTL 1 describes an effective component generation device (electrostatic atomization device) having a configuration in which internal components including a circuit board is housed in a case. The circuit board holds an electrostatic atomization generator including a discharger (discharge electrode), a drive circuit (high voltage application unit), an air blower, and the like. These internal components are housed in the case as one unit.

The case constitutes the shell of the effective component generation device. The circuit board is supported by a support portion provided in the case, and is fixed by a fixing tool. The case is formed of a conductive material such as metal, and the fixing tool for fixing the circuit board to the case also serves as a ground. This reduces electromagnetic noise generated when the effective component generation device performs discharge. Further, the case is provided with an air supply port (hole) into which air flows and a discharge port for charged fine water particles generated by electrostatic atomization.

The effective component generation device described in PTL 1 further includes a cover. The cover is held on the circuit board so as to cover the discharger. A rear surface of the cover faces a front surface of the air blower in a contact state. As a result, an air flow (airflow) generated by the air blower is sent into a space surrounded by the cover and the circuit board. Then, the supplied air flow merges with the charged fine particle water generated in the discharger, and is discharged to an outside from the discharge port.

However, in a configuration of the effective component generation device described in PTL 1, the flow of air is not particularly controlled in a section from the air supply port to the air blower in an inner space of the case. Therefore, a loss of an air flow that outputs an effective component (for example, charged fine particle water) to an outside of the case is likely to occur in the case.

CITATION LIST

Patent Literature

PTL 1: International Publication No. 2013/035453 A

SUMMARY OF THE INVENTION

The present disclosure provides an effective component generation device capable of efficiently generating an air flow without loss for outputting an effective component to an outside of a case.

An effective component generation device according to one aspect of the present disclosure includes an internal component, a case, and an air passage member. The internal components include a discharger that generates an effective component. The case is formed in a box shape having a discharge port through which the effective component is discharged, and houses the internal component. The air passage member is housed in the case and surrounds the discharger. The internal component further includes an air blower. The air blower generates an air flow that outputs the effective component to the outside of the case through the discharge port. The air passage member has an upstream block and a downstream block that are integrally formed. The upstream block forms an air supply passage on an upstream side when viewed from the air blower. The downstream block forms an air discharge passage on a downstream side as viewed from the air blower. The air passage member includes the air supply passage and the air discharge passage in the case, and constitutes an air passage through which an air flow passes.

According to the present disclosure, it is possible to provide an effective component generation device capable of efficiently generating an air flow that outputs an effective component to the outside of a case by an air passage member constituting an air passage.

DESCRIPTION OF EMBODIMENTS

First Exemplary Embodiment

Figure 1A:
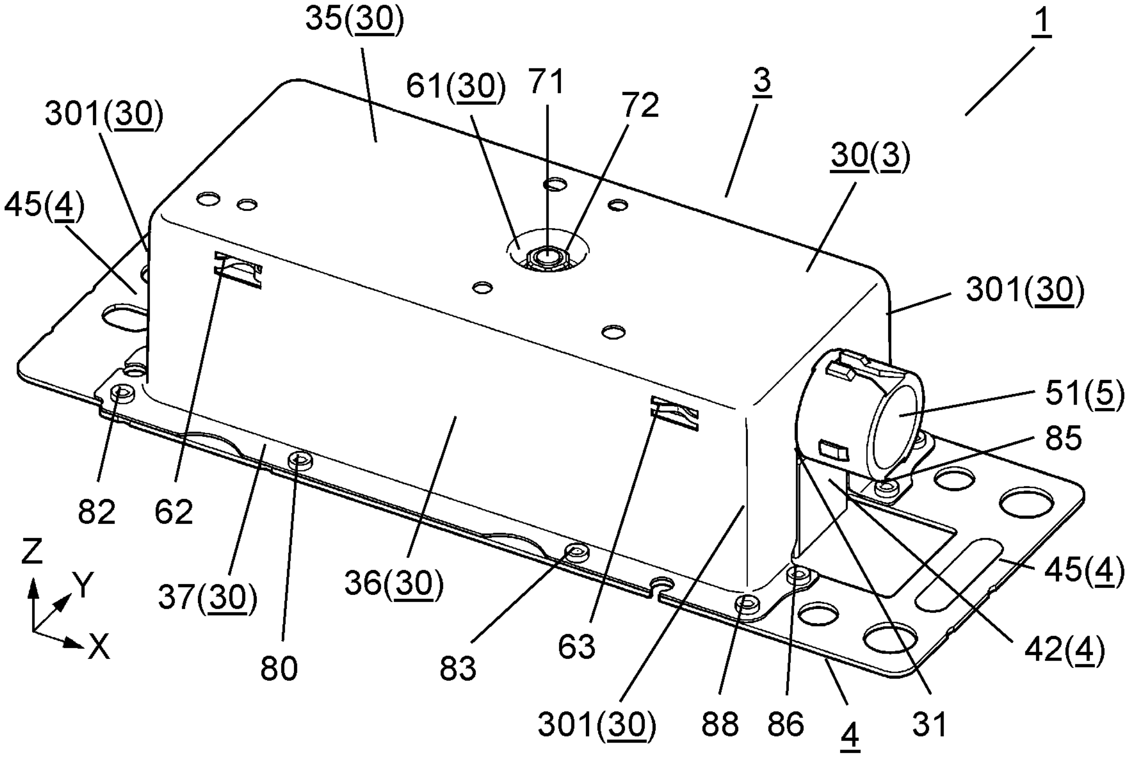
FIG. 1A is a perspective view of an effective component generation device according to a first exemplary embodiment.

Hereinafter, effective component generation device 1 according to a first exemplary embodiment will be described in terms of items with reference to the drawings.

(1) Outline

First, an outline of effective component generation device 1 according to the first exemplary embodiment will be described with reference to FIGS. 1A to 3 and FIG. 13.

Effective component generation device 1 includes discharger 21 (see FIG. 2) that generates an effective component. In the first exemplary embodiment, discharger 21 includes discharge electrode 211 (see FIG. 5), counter electrode 212 (see FIG. 5), and the like. When a voltage is applied between discharge electrode 211 and counter electrode 212, discharge is generated between the electrodes of discharger 21.

The "effective component" in the present disclosure is a component generated by the discharge of discharger 21. As an example, the effective component means a charged microparticle liquid containing OH radicals, OH radicals, $O_2$ radicals, negative ions, positive ions, ozone, nitrate ions, or the like. These effective components constitute a basis for exerting useful effects in various situations including sterile filtration, odor removal, moisture keeping, freshness keeping, and virus inactivation.

Effective component generation device 1 includes case 3 in addition to internal components 2 (see FIG. 2) including discharger 21. Case 3 constitutes an outer shell of effective component generation device 1. Case 3 houses internal components 2 therein. Thus, effective component generation device 1 that is unitized is configured. Case 3 has discharge port 31 through which an effective component is discharged and air supply port 32 through which air is taken into case 3.

Internal components 2 further include air blower 22. Air blower 22 generates an air flow (wind) flowing from air supply port 32 of case 3 toward discharge port 31. As a result, an air taken into case 3 from air supply port 32 is discharged to the outside of case 3 from discharge port 31. As a result, the effective component generated in discharger 21 is discharged to the outside of case 3 through discharge port 31 along with an airflow generated in air blower 22.

Figure 13:
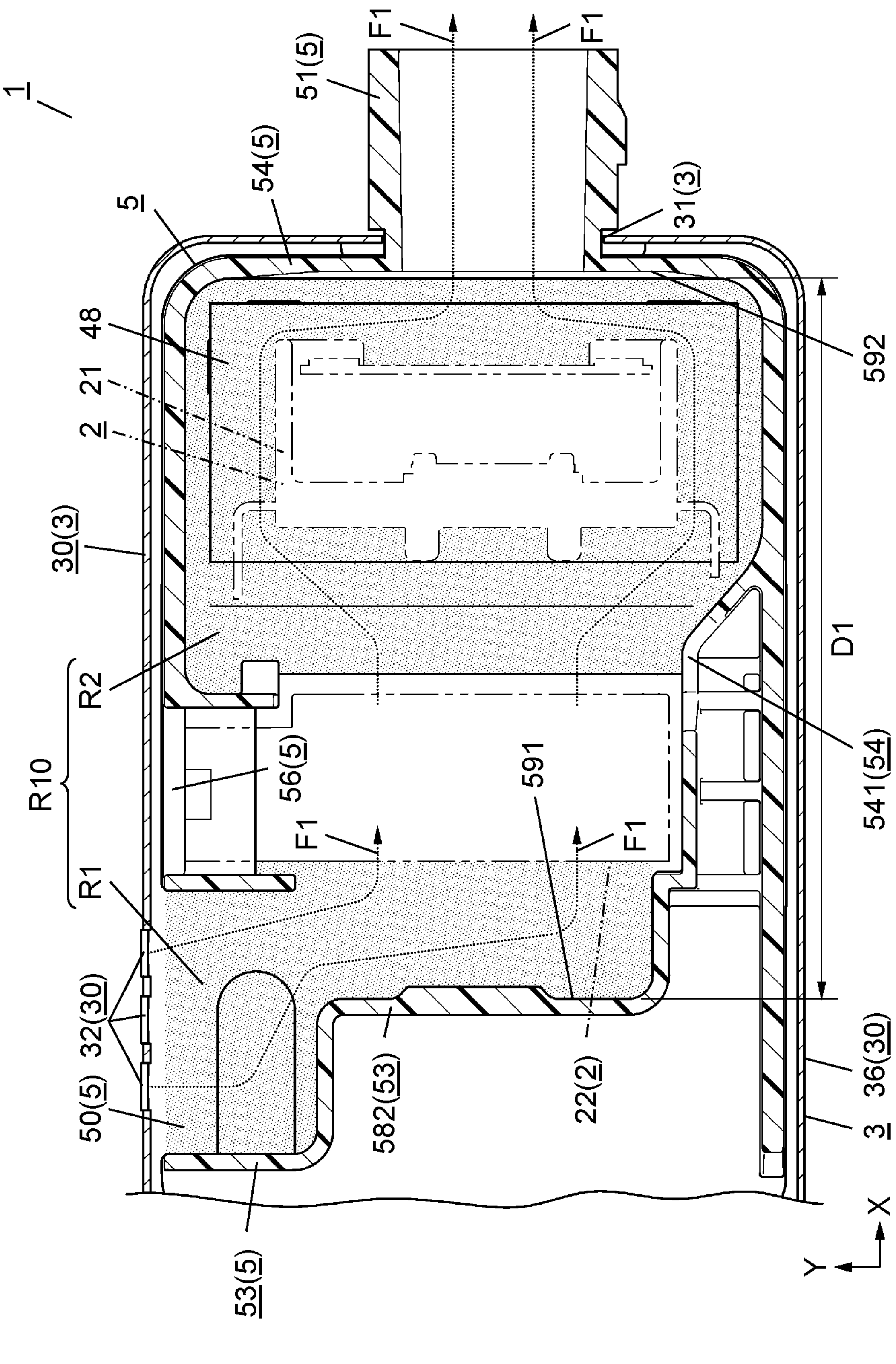
FIG. 13 is a schematic view for explaining an internal structure of the air passage member of the effective component generation device.

That is, effective component generation device 1 of the first exemplary embodiment includes internal components 2 including discharger 21, case 3, and air passage member 5 (see FIG. 13). Discharger 21 generates the effective component. Case 3 is formed in a box shape having air supply port 32 and discharge port 31. Discharge port 31 is a port (opening) for releasing the effective component. Case 3 houses internal components 2. Air passage member 5 is housed in case 3 and surrounds discharger 21. Internal components 2 further include air blower 22 (see FIG. 13). Air blower 22 generates air flow F1 (see FIG. 13) that outputs the effective component to an outside of case 3 from discharge port 31. Air passage member 5 includes upstream block 53 (see FIG. 13) and downstream block 54 (see FIG. 13) that are integrally formed. Upstream block 53 forms air supply passage R1 (see FIG. 13) on an upstream side as viewed from air blower 22. Downstream block 54 forms air discharge passage R2 (see FIG. 13) on a downstream side as viewed from air blower 22. That is, air passage member 5 includes air supply passage R1 and air discharge passage R2 in case 3, and forms air passage R10 (see FIG. 13) through which air flow F1 passes.

Note that the "integral(ly)" in the present disclosure means an aspect in which a plurality of elements (parts) can be physically handled as one body. That is, "integral elements" means that a plurality of elements are integrated into one and can be handled as one member. In this case, the elements may be in an integrally inseparable relationship, such as an integrally molded product, or may be in a relationship in which a plurality of separately produced elements are mechanically coupled by caulking, bonding, welding, screw fixing, for example. That is, upstream block 53 and downstream block 54 included in air passage member 5 may be integrated in an appropriate manner.

In other words, according to effective component generation device 1 of the first exemplary embodiment, air passage member 5 constitutes air passage R10 including air supply passage R1 on the upstream side as viewed from air blower 22 and air discharge passage R2 on the downstream side as viewed from air blower 22, and is housed in case 3. Furthermore, air passage member 5 includes upstream block 53 forming air supply passage R1 and downstream block 54 forming air discharge passage R2 that are integrally formed. Therefore, air passage member 5 controls the flow of air (air flow F1) on either an upstream side or a downstream side of air blower 22 in an inner space in case 3 where air passage member 5 is to be stored. Accordingly, a loss of air flow F1 that outputs the effective component generated by discharger 21 to the outside of case 3 is less likely to occur in case 3. As a result, there is an advantage that air flow F1 that outputs the effective component to the outside of case 3 can be efficiently generated.

In addition, in the first exemplary embodiment, case 3 includes metal body 30 including at least bottom plate 35 and peripheral walls 36. Metal body 30 surrounds at least discharger 21 of internal components 2. That is, hereinafter, a case where the metal body and the case are made of the same element will be described as an example, but since the metal body only needs to be configured to surround the discharger, only a part of the case may be constituted from the metal body. Metal body 30 has seamless portion 301 at a corner portion between two surfaces of adjacent peripheral walls 36 oriented in different directions (X direction and Y direction).

Note that the "seamless portion" of the present disclosure means a portion that seamlessly connects two surfaces of adjacent peripheral walls 36 at a corner portion between the two adjacent surfaces of peripheral walls 36 oriented in different directions.

That is, seamless portion 301 fills at least a part of a gap between the two surfaces of adjacent peripheral walls 36 at the corner portion of peripheral walls 36. Thus, the two surfaces of adjacent peripheral walls 36 are continuously connected seamlessly.

Note that seamless portion 301 may be configured to reduce the gap so as to fill at least a part of the gap between the two surfaces of adjacent peripheral walls 36. Therefore, seamless portion 301 includes both a configuration in which the gap is completely filled and a configuration in which only a part of the gap is filled. That is, seamless portion 301 may be configured to close at least a part of the gap so as to reduce the gap between the two surfaces of adjacent peripheral walls 36 at each corner portion of metal body 30. Therefore, in effective component generation device 1 of the first exemplary embodiment, although there are seamless portions 301, there may be a configuration in which there is a slight gap or hole at a corner portion between two surfaces of adjacent peripheral walls 36 oriented in different directions in metal body 30.

As described above, according to effective component generation device 1 of the first exemplary embodiment, at least discharger 21 is surrounded by metal body 30. Therefore, metal body 30 functions as a shield against electromagnetic noise generated at the time of discharge in discharger 21. Further, metal body 30 has a seamless portion 301 at each corner portion between two surfaces of adjacent peripheral walls 36 oriented in different directions. Seamless portion 301 makes it possible to reduce the electromagnetic noise leaking from the gap at the corner portion between the two surfaces of adjacent peripheral walls 36. That is, according to effective component generation device 1, there is an advantage that the influence of the electromagnetic noise to the outside of case 3 can be more actively reduced.

(2) Details

Next, details of effective component generation device 1 according to the first exemplary embodiment will be described with reference to FIGS. 1A to 13.

In the following description, as an example, three axes of an X-axis, a Y-axis, and a Z-axis orthogonal to each other are set as illustrated in the drawings. Specifically, an axis along a longitudinal direction of case 3 is referred to as the "X-axis", and an axis along a direction in which case 3 and lid body 4 are combined is referred to as the "Z-axis". The "Y-axis" is an axis orthogonal to both the X-axis and the Z-axis and extending along a lateral direction of case 3. Further, a direction in which the effective component is released from discharge port 31 of case 3 is defined as a positive direction of the X-axis, and a side of case 3 viewed from lid body 4 is defined as a positive direction of the Z-axis. In addition, hereinafter, a state viewed from the positive direction of the Z-axis may be referred to as a "plan view". Each of the X-axis, Y-axis, and Z-axis is a virtual axis. Arrows denoted as "X", "Y", and "Z" in drawings express the X-axis, Y-axis, and Z-axis, respectively, for better description, and do not represent axes as real entity. It should be noted that these directions are not intended to specify the direction of use of effective component generation device 1.

Hereinafter, as an example, a case where effective component generation device 1 is mounted in a vehicle will be described. That is, effective component generation device 1 is disposed inside a dashboard, for example. As a result, effective component generation device 1 is used in such a manner that an effective component is released into a duct of an in-vehicle air conditioning facility and the effective component is released into the vehicle using a blow-out port of the air conditioning facility.

(2.1) Overall Configuration

Next, an overall configuration of effective component generation device 1 according to the first exemplary embodiment will be described with reference to FIGS. 1A to 3.

As described above, effective component generation device 1 according to the first exemplary embodiment includes internal components 2 including discharger 21, case 3, and air passage member 5 (see FIG. 13). Discharger 21 generates an effective component by discharging. Case 3 is formed in a box shape having discharge port 31 through which an effective component is released. Effective component generation device 1 further includes lid body 4, buffer 41 (see FIG. 2), air passage member 5, and the like in addition to internal components 2 and case 3.

Lid body 4 is joined to case 3. Case 3 has opening 33 formed in peripheral walls 36 separately from discharge port 31. Lid body 4 is joined to case 3 so as to close opening 33 in a state where internal components 2 are housed between lid body 4 and case 3. That is, case 3 is formed in a box shape in which one surface (one surface orthogonal to the Z-axis) is opened as opening 33. Lid body 4 is joined to case 3 to close opening 33. Thus, lid body 4 constitutes an outer shell of effective component generation device 1 together with case 3. Internal components 2 are housed in an inner space of case 3 surrounded by case 3 and lid body 4. As a result, internal components 2 are covered with lid body 4 so as not to be exposed from opening 33 in a state of being assembled in case 3 from opening 33.

A joint structure between case 3 and lid body 4 will be described in detail in a section of "(2.5) Joint structure between case and lid body".

Case 3 of the first exemplary embodiment is formed of, for example, a conductive metal sheet such as SECD. Therefore, entire case 3 is metal body 30 made of metal. Similarly to case 3, lid body 4 is also formed of a conductive metal sheet. Therefore, entire lid body 4 is also made of metal. As a result, internal components 2 are housed in a space surrounded by metal members (case 3 and lid body 4).

As will be described in detail in a section of "(2.6) Fixing structure of internal component", internal components 2 are fixed to case 3 and housed in case 3. Further, case 3 will be described in detail in a section of "(2.4) Detailed configuration of case".

Lid body 4 is formed in a rectangular shape with the X-axis direction as a longitudinal direction and the Y-axis direction as a lateral direction in plan view. Lid body 4 includes first closing piece 42 that closes a part of discharge port 31 of case 3 and second closing piece 43 that closes a part of connector port 34 of case 3. Each of first closing piece 42 and second closing piece 43 is formed by a cut-and-raised portion (cut-and-bent portion) of a metal sheet constituting lid body 4. Lid body 4 further includes ribs 44 extending in the longitudinal direction (X-axis direction). Ribs 44 reinforce strength against bending or the like of lid body 4.

Lid body 4 is formed to have a dimension in which the longitudinal direction is larger than that of case 3. Therefore, in a state where lid body 4 is joined to case 3, at least both end portions of lid body 4 in the longitudinal direction protrude outward from case 3 in plan view. That is, lid body 4 has overhanging portions 45 overhanging outward from outer peripheral edges of case 3 in the X-axis direction in plan view. In effective component generation device 1, overhanging portions 45 of lid body 4 are, for example, screwed to an attachment object (In the first exemplary embodiment, for example, a vehicle). As a result, effective component generation device 1 is attached to the attachment object such as a vehicle.

Buffer 41 is disposed between lid body 4 and a part of internal components 2, and sandwiched therebetween. That is, buffer 41 is housed together with internal components 2 in the inner space of case 3 surrounded by case 3 and lid body 4. In the first exemplary embodiment, buffer 41 is attached to lid body 4 which is an opposing surface facing case 3.

Specifically, buffer 41 is disposed so as to be sandwiched between air blower 22 which is a part of internal components 2, and lid body 4. That is, internal components 2 include air blower 22 that generates air flow F1 (see FIG. 13) for outputting an effective component from discharge port 31 to the outside of case 3. Buffer 41 is disposed in contact with at least air blower 22.

Therefore, air blower 22 is not brought into direct contact with lid body 4, and buffer 41 is interposed between air blower 22 and lid body 4. Buffer 41 is made of a material having elasticity. As an example, buffer 41 is formed of a cushion material such as ethylene propylene diene rubber (EPDM) foam. Therefore, in a state where lid body 4 is joined to case 3, buffer 41 is compressed between lid body 4 and air blower 22. As a result, internal components 2 are pressed against bottom surface 310 (see FIG. 4) of bottom plate 35 of case 3 by elastic force of buffer 41. As a result, movement of internal components 2 generated in a direction away from bottom surface 310 of case 3, vibration of internal components 2, and the like are absorbed and suppressed by buffer 41. In the first exemplary embodiment, in particular, buffer 41 is brought into contact with air blower 22 which has a movable portion and thus easily generates mechanical vibration. As a result, mechanical vibration generated in air blower 22 can be effectively suppressed.

Air passage member 5 is housed in case 3. That is, air passage member 5 is housed in the inner space of case 3 surrounded by case 3 and lid body 4 together with internal components 2 and buffer 41. In the first exemplary embodiment, air passage member 5 is disposed between internal component 2 and lid body 4 in a state of being fixed to lid body 4. Air passage member 5 forms air passage R10 (see FIG. 13) through which air flow F1 (wind) passes between air supply port 32 and air discharge port 31 of case 3. Air passage member 5 divides the inner space of case 3 into a space through which air flow F1 passes and the other space. Accordingly, air passage member 5 forms air passage R10 in case 3.

Furthermore, air blower 22 and discharger 21 of internal components 2 are disposed in a middle of air passage R10 formed by air passage member 5. Air blower 22 generates air flow F1 (wind) flowing from air supply port 32 toward discharge port 31 through air passage R10. In the first exemplary embodiment, discharger 21 is disposed on a downstream side of air blower 22 in air passage R10, that is, between air blower 22 and discharge port 31.

Therefore, air taken into case 3 from air supply port 32 moves through air passage R10 of air passage member 5 to discharge port 31 in case 3, and is discharged from discharge port 31 to the outside of case 3. At this time, the effective component generated in discharger 21 is discharged from discharge port 31 to the outside of the case 3 with air flow F1 generated by air blower 22. That is, air blower 22 is disposed between air supply port 32 and discharger 21 in air passage R10. As a result, the effective component generated in discharger 21 is pushed out to discharge port 31 by air blower 22, and discharged to the outside of case 3.

Air passage R10 formed by air passage member 5 includes air supply passage R1 (see FIG. 13) on the upstream side of air blower 22 and air discharge passage R2 (see FIG. 13) on the downstream side of air blower 22. Air supply passage R1 connects between air blower 22 and air supply port 32. Air discharge passage R2 connects between air blower 22 and discharge port 31. Accordingly, air passage member 5 controls the flow of air (including the effective component) such that the effective component is relatively efficiently released to the outside of case 3.

Figure 3:
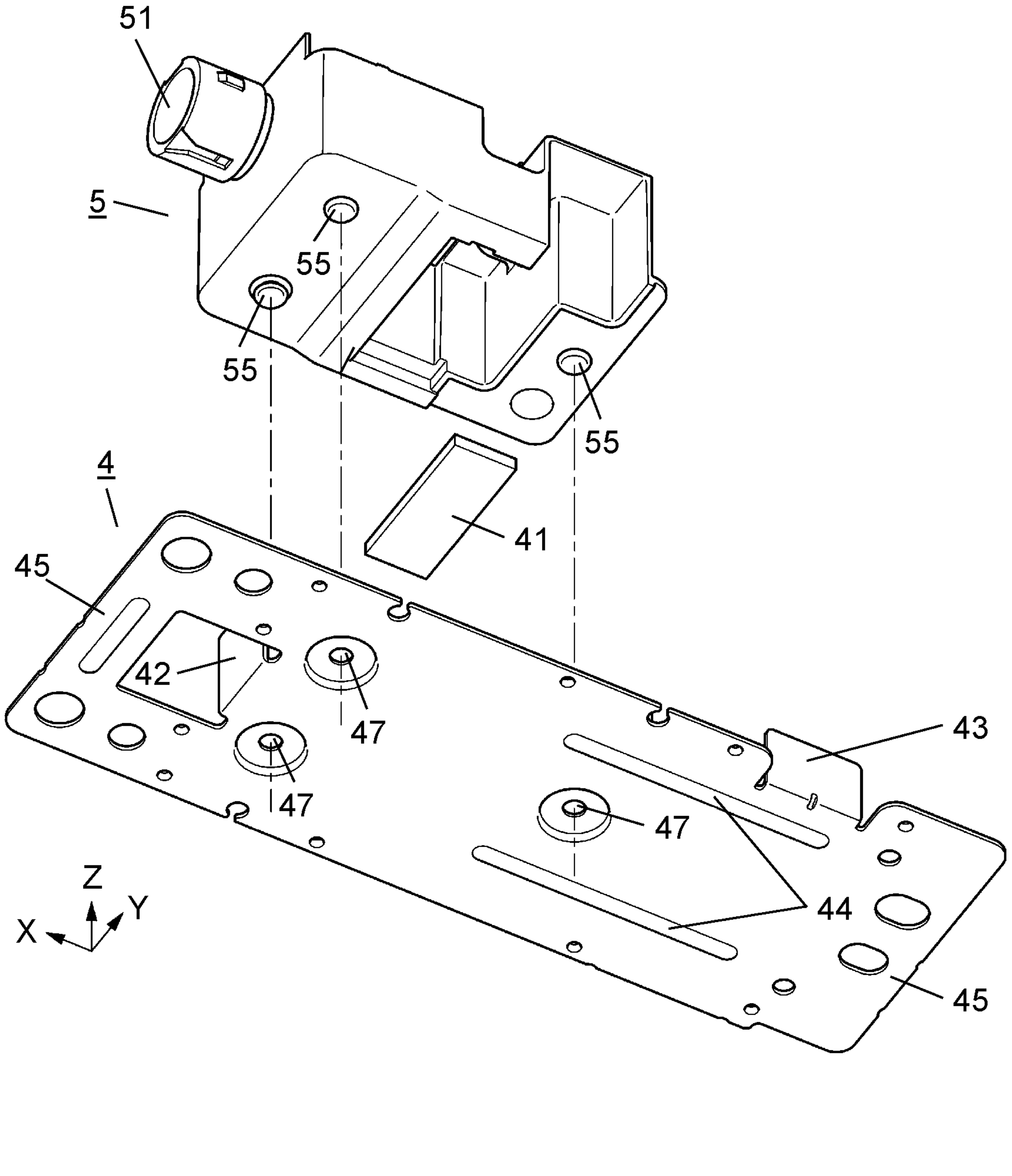
FIG. 3 is an exploded perspective view illustrating a lid body, an air passage member, and a buffer of the effective component generation device.

In the first exemplary embodiment, air passage member 5 is made of a synthetic resin such as polybutylene terephthalate (PBT). Air passage member 5 made of a resin molded article is fixed to lid body 4 made of a metal sheet. As illustrated in FIG. 3, air passage member 5 is fixed to lid body 4 by, for example, a method such as thermal caulking.

Specifically, air passage member 5 has a plurality of (for example, three) caulked portions 55, and lid body 4 has a plurality of (for example, three) caulking holes 47. Furthermore, three caulked portions 55 of air passage member 5 are caulked with three caulking holes 47 of lid body 4. This fixes air passage member 5 to one surface side (the positive side of the Z-axis) of lid body 4.

Further, air passage member 5 is integrally formed with nozzle 51 that discharges air containing the effective component. That is, effective component generation device 1 of the first exemplary embodiment includes nozzle 51 integrally formed with air passage member 5. Nozzle 51 is disposed in discharge port 31 of case 3. As a result, the air discharged from discharge port 31 to the outside of case 3 is discharged to the outside of case 3 through nozzle 51.

Note that air passage member 5 will be described in detail in a section of "(2.7) Air passage member".

(2.2) Configuration of Iternal Components

Figure 2:
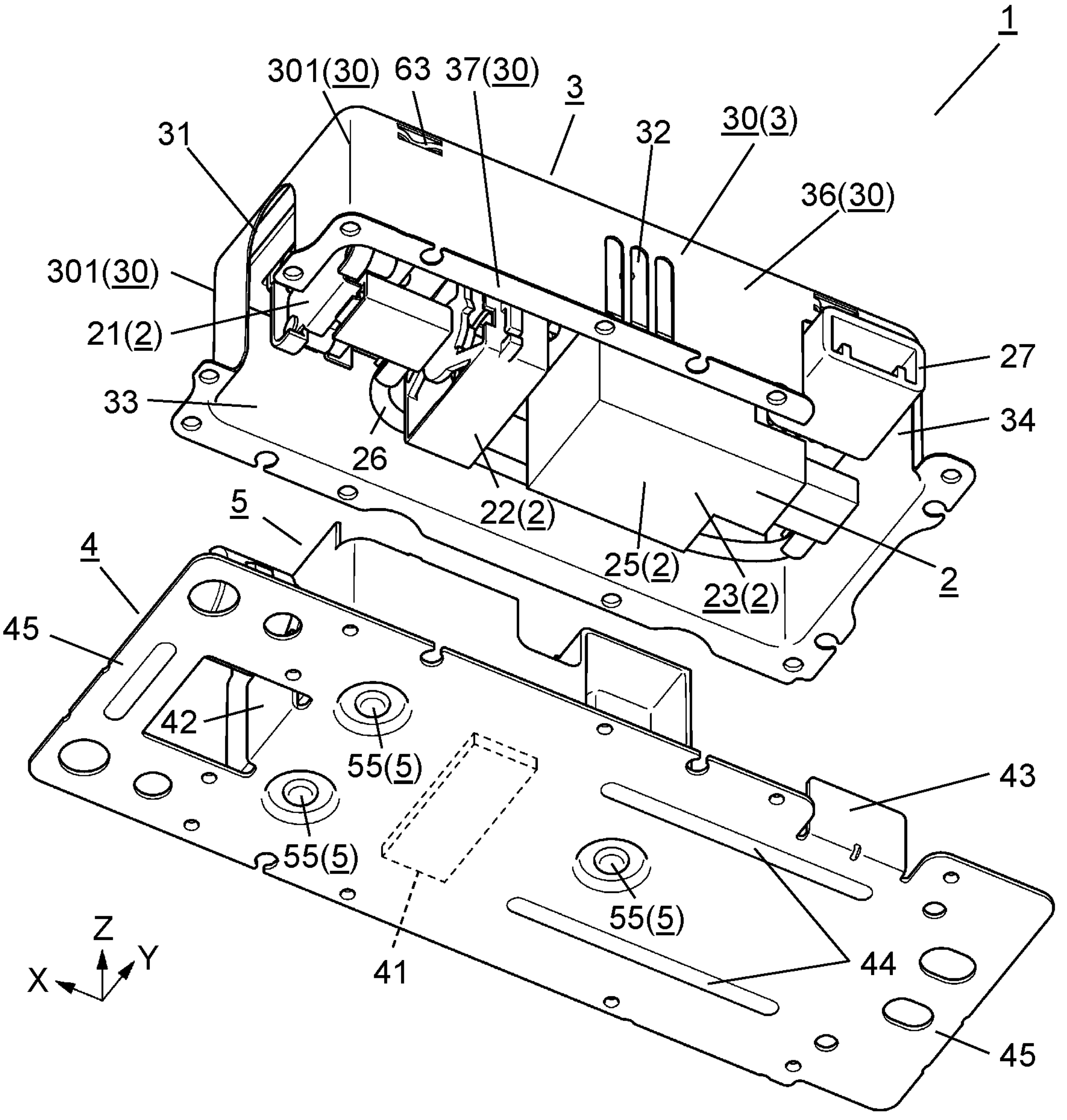
FIG. 2 is an exploded perspective view of the effective component generation device.
Figure 4:
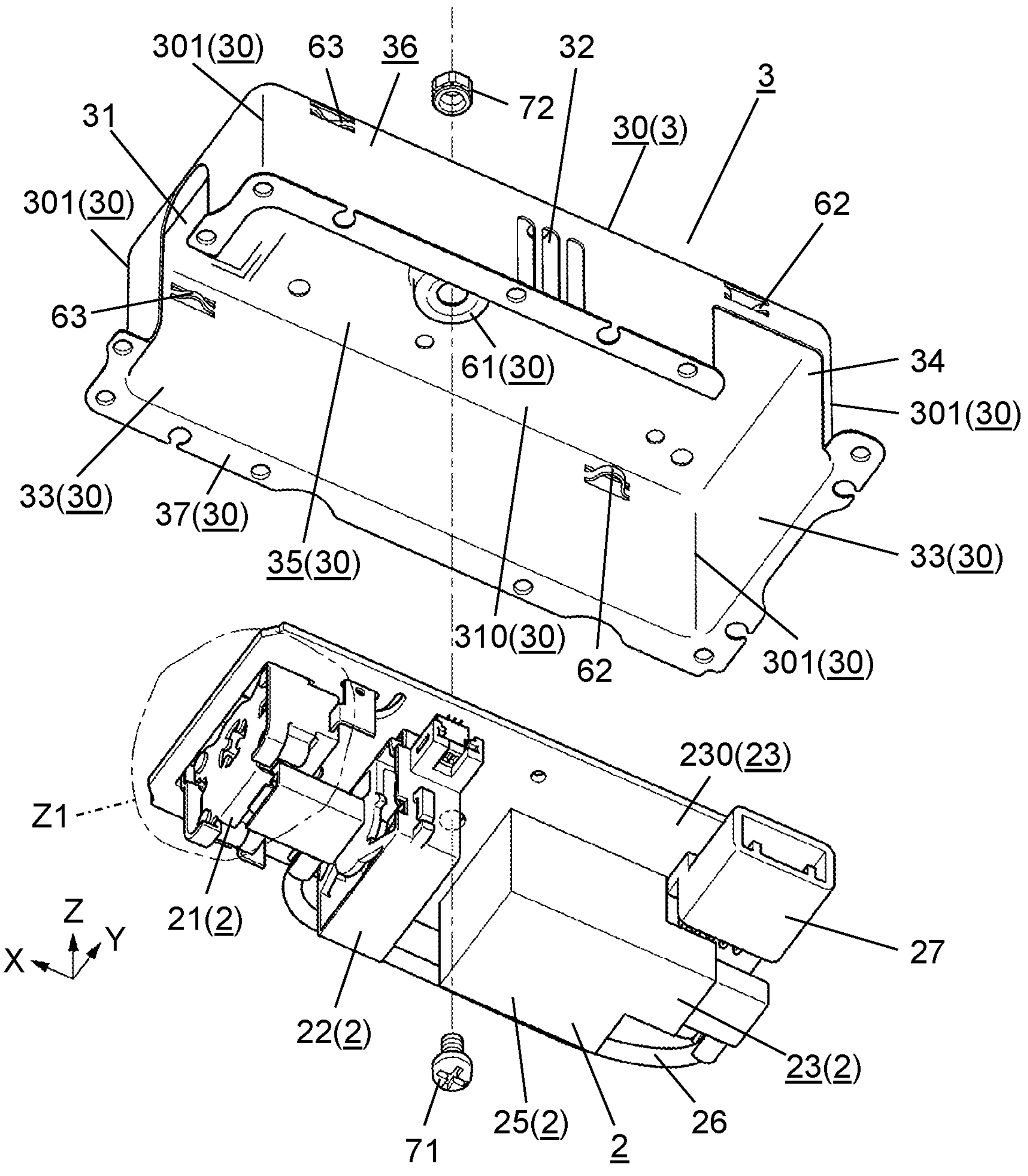
FIG. 4 is an exploded perspective view illustrating a case and internal components of the effective component generation device.

Next, the configuration of internal components 2 will be described with reference to FIGS. 2, 4, and 5.

Internal components 2 further include drive circuit 23 and liquid supply unit 24 (see FIG. 5) in addition to discharger 21 and air blower 22.

Figure 5:
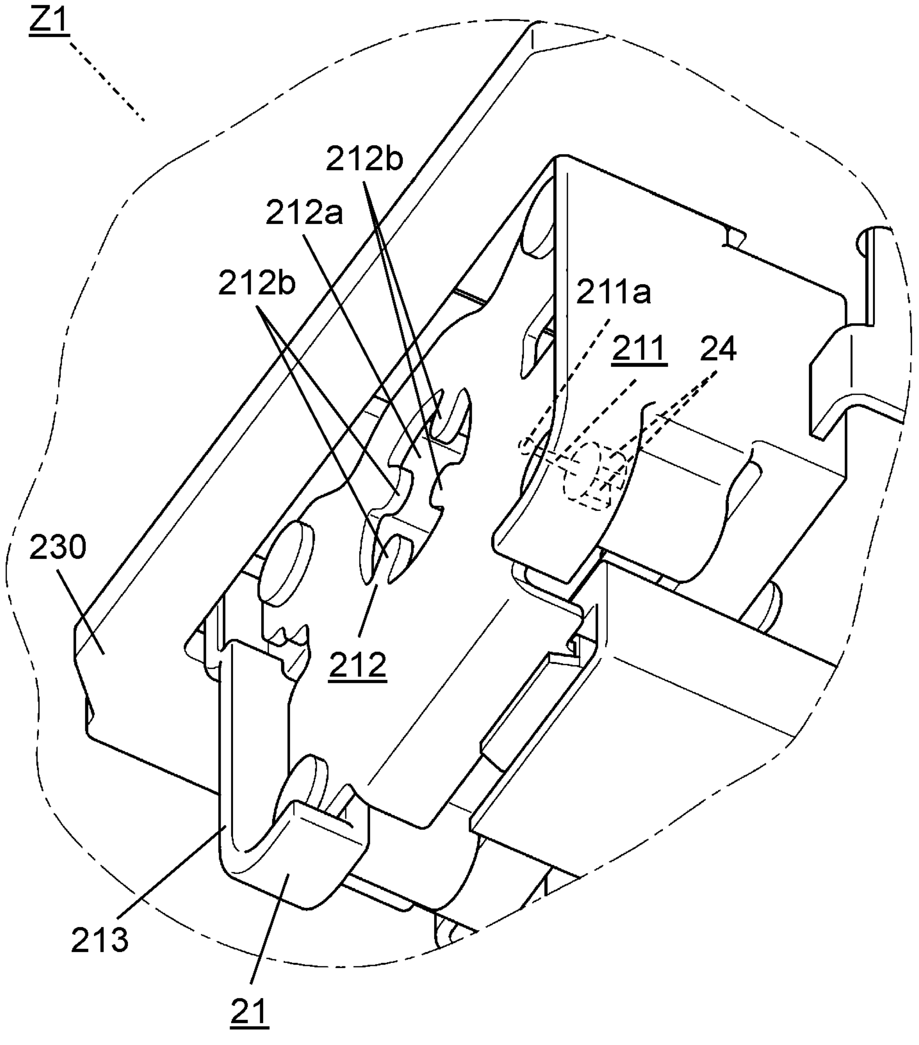
FIG. 5 is a schematic perspective view of enlarged region Z1 in FIG. 4.

As illustrated in FIG. 5, discharger 21 includes discharge electrode 211, counter electrode 212, and the like. Discharger 21 further includes holding block 213 made of an electrically insulating synthetic resin such as syndiotactic polystyrene (SPS).

As described above, discharger 21 generates discharge by applying a voltage between discharge electrode 211 and counter electrode 212.

Discharge electrode 211 is a columnar electrode extending along the X-axis. Discharge electrode 211 is a needle electrode in which at least distal end 211*a* in the longitudinal direction (X-axis direction) is formed in a tapered shape. The "tapered shape" herein is not limited to a shape having a highly sharpened distal end, and includes a shape having a rounded tip. In the example illustrated in FIG. 5, distal end 211*a* of discharge electrode 211 has a spherical shape, specifically, a half (a hemispherical portion on the positive side of the X-axis) of distal end 211*a* facing discharge electrode 211 has a rounded tapered shape. Discharge electrode 211 is made of, for example, a conductive metal material such as a titanium alloy (Ti alloy).

Counter electrode 212 is disposed so as to face distal end 211*a* of discharge electrode 211. In the first exemplary embodiment, counter electrode 212 is formed of a metal sheet, and is disposed at a position away from distal end 211*a* of discharge electrode 211 in the positive direction of the X-axis. Counter electrode 212 has through-hole 212*a* formed in a part of counter electrode 212, and penetrating the metal sheet in a thickness direction (X-axis direction). Further, counter electrode 212 includes a plurality of (for example, four) projecting electrode portions 212*b* formed so as to project from peripheral edges of through-hole 212*a* toward a center of through-hole 212*a*. Counter electrode 212 is made of, for example, a conductive metal material such as a titanium alloy (Ti alloy).

Holding block 213 holds discharge electrode 211 and counter electrode 212. Holding block 213 is coupled to counter electrode 212 by thermal caulking, for example. As a result, counter electrode 212 is held by holding block 213. In a state where discharge electrode 211 and counter electrode 212 are held by holding block 213, the center of through-hole 212*a* is located on a center axis of discharge electrode 211 as viewed from one side of the center axis of discharge electrode 211.

Air blower 22 that is a part of internal components 2 is configured by, for example, a fan motor. That is, air blower 22 includes a fan and a motor mechanically connected to the fan. In air blower 22, the motor is rotated by power supply to the motor, and the fan is rotated. Accordingly, air blower 22 generates an air flow flowing along a rotation axis of the fan. That is, in the first exemplary embodiment, air blower 22 is disposed such that the rotation axis of the fan is parallel to the X-axis. Therefore, air blower 22 generates an air flow (wind) flowing in the positive direction of the X-axis from air supply port 32 toward discharge port 31 of case 3 along the X-axis.

Drive circuit 23 that is a part of internal components 2 includes circuit board 230 and various mounting components such as transformer 25. The mounting components such as transformer 25 are mounted on circuit board 230. In the first exemplary embodiment, not only the mounting components (such as transformer 25) constituting drive circuit 23 but also discharger 21, air blower 22, liquid supply unit 24, connector 27, and the like are mounted on circuit board 230. Connector 27 electrically connects drive circuit 23 to an external circuit. Here, the "mounting" means mechanical and electrical connection to circuit board 230. That is, the mounting components (such as transformer 25), discharger 21, air blower 22, liquid supply unit 24, and connector 27 are mechanically connected (joined) and electrically connected to circuit board 230 by a method such as soldering or connector connection. In the first exemplary embodiment, the mechanical connection of air blower 22 to circuit board 230 is achieved by, for example, snap-fitting in which a claw (hook) provided in air blower 22 is hooked on circuit board 230.

Drive circuit 23 is a circuit that drives discharger 21. That is, drive circuit 23 applies an application voltage between discharge electrode 211 and counter electrode 212 constituting discharger 21. As a result, drive circuit 23 generates discharge between the electrodes of discharger 21. Note that the "application voltage" stated in the present disclosure means the voltage that drive circuit 23 applies across discharge electrode 211 and counter electrode 212 to cause discharger 21 to discharge.

That is, drive circuit 23 receives power supply from, for example, an external power supply, and generates the voltage (application voltage) to be applied to discharger 21. Here, the "power supply" is a power supply that supplies power for operation to drive circuit 23 and the like. Specifically, the power supply generates a DC voltage of, for example, about several V to several tens of V, and inputs the generated voltage to drive circuit 23. Drive circuit 23 boosts an input voltage from the power supply by transformer 25, and outputs the boosted voltage to discharger 21 as an application voltage. That is, drive circuit 23 generates a high voltage (application voltage) for causing discharger 21 to discharge on a secondary side of transformer 25.

Here, drive circuit 23 includes a reference potential point electrically connected to metal body 30. In the first exemplary embodiment, the reference potential point corresponds to the ground of drive circuit 23. That is, metal body 30 of case 3 is electrically connected to the ground that is the reference potential point of drive circuit 23. As a result, a frame ground of drive circuit 23 is achieved.

Drive circuit 23 is electrically connected to discharger 21 (discharge electrode 211 and counter electrode 212). Specifically, connection terminal 252 (see FIG. 10) that is a secondary terminal of transformer 25 in drive circuit 23 is electrically connected to discharger 21 through harness 26. In drive circuit 23 of the first exemplary embodiment, a high voltage is applied between discharge electrode 211 and counter electrode 212 with discharge electrode 211 as a negative electrode (ground) and counter electrode 212 as a positive electrode.

That is, connection terminal 252 of transformer 25 is connected to counter electrode 212 of discharger 21, and the ground is connected to discharge electrode 211 as a reference potential point set on circuit board 230. As a result, drive circuit 23 applies a high voltage to discharger 21 such that discharge electrode 211 is on a low potential side and counter electrode 212 is on a high potential side. Here, the "high voltage" only needs to be a voltage set such that full-scale dielectric breakdown discharge or partial dielectric breakdown discharge described later occurs in discharger 21. The high voltage is, for example, a voltage having a peak of about 6.0 kV.

The full-scale dielectric breakdown discharge and the partial dielectric breakdown discharge will be described in detail in the section of "(2.3) Operation".

Liquid supply unit 24 that is a part of internal components 2 supplies liquid to discharge electrode 211 of discharger 21. Effective component generation device 1 electrostatically atomizes the liquid supplied from liquid supply unit 24 by the discharge generated in discharger 21.

Specifically, the liquid supplied from liquid supply unit 24 adheres to a surface of discharge electrode 211. Then, the application voltage is applied from drive circuit 23 to discharger 21 in a state where the liquid is held in discharge electrode 211. As a result, discharge is generated in discharger 21. In this configuration, the liquid held by discharge electrode 211 is electrostatically atomized by discharge energy generated in discharger 21. In the present disclosure, the liquid held in discharge electrode 211, that is, a liquid to be electrostatically atomized is also simply referred to as "liquid".

Liquid supply unit 24 supplies the liquid for electrostatic atomization to discharge electrode 211. Liquid supply unit 24 includes, for example, a Peltier element. The Peltier element cools discharge electrode 211 to generate dew condensation water on discharge electrode 211, and supplies liquid (dew condensation water) to discharge electrode 211. That is, liquid supply unit 24 cools discharge electrode 211 thermally coupled with the Peltier element by energization to the Peltier element from drive circuit 23. Accordingly, moisture in the air condenses and adheres to the surface of discharge electrode 211 as dew condensation water. That is, liquid supply unit 24 is configured to cool discharge electrode 211 and generate dew condensation water as liquid on the surface of discharge electrode 211. According to this configuration, liquid supply unit 24 supplies the liquid (dew condensation water) to discharge electrode 211 using the moisture in the air. This eliminates the need for additional components such as supplying and refilling liquid to effective component generation device 1.

(2.3) Operation

Effective component generation device 1 configured as described above causes discharge in discharger 21 (discharge electrode 211 and counter electrode 212) by operation of drive circuit 23 described below.

Here, drive circuit 23 includes two modes of a first mode and a second mode as operation modes. The first mode is a mode for increasing application voltage in accordance with an elapse of time to form a discharge path developed from a corona discharge and dielectrically broken at least partially between discharge electrode 211 and opposite electrode 212, to consequently generate a discharge current. The second mode is a mode for cutting off the discharge current by bringing discharger 21 into an overcurrent state. The "discharge current" in the present disclosure means a relatively large current flowing through the discharge path. Therefore, the discharge current does not include a minute current of about several μA generated in the corona discharge before the discharge path is formed. In addition, the "overcurrent state" of the present disclosure means a state in which a current equal to or larger than an assumed value flows through discharger 21 due to discharge.

In effective component generation device 1 according to the first exemplary embodiment, drive circuit 23 operates to alternately repeat the first mode and the second mode during a drive period. That is, drive circuit 23 switches between the first mode and the second mode at a drive frequency at which a magnitude of the application voltage applied to discharger 21 is periodically varied. The "drive period" of the present disclosure is a period during which drive circuit 23 that causes discharger 21 to discharge operates.

That is, drive circuit 23 does not keep the magnitude of the voltage applied to discharger 21 including discharge electrode 211 at a fixed value, but periodically changes the voltage at a drive frequency within a predetermined range. As a result, drive circuit 23 intermittently causes discharger 21 to discharge. That is, the discharge path is periodically formed in accordance with a change cycle of the application voltage, and the discharge is periodically generated. In the following description, a cycle at which discharge (full-scale dielectric breakdown discharge or partial dielectric breakdown discharge) occurs is referred to as a "discharge cycle", in some cases.

By the operation of drive circuit 23 described above, the magnitude of the electric energy acting on the liquid held by discharge electrode 211 periodically fluctuates according to the drive frequency. As a result, the liquid held by discharge electrode 211 mechanically vibrates according to the fluctuation of the drive frequency.

That is, drive circuit 23 applies a voltage to discharger 21 including discharge electrode 211. As a result, a force due to the electric field acts on the liquid held by discharge electrode 211, and the liquid is deformed.

Note that, in the first exemplary embodiment, voltage is applied between counter electrode 212 facing distal end 211*a* of discharge electrode 211 and discharge electrode 211. Therefore, a force in a direction of being pulled toward counter electrode 212 by an electric field acts on the liquid. As a result, the liquid held by distal end 211*a* of discharge electrode 211 extends toward counter electrode 212 along a center axis of discharge electrode 211 (along the X-axis), and forms a conical shape called a Taylor cone. Then, when the voltage applied to discharger 21 decreases, the force acting on the liquid due to the influence of the electric field also decreases, and thus the liquid is deformed from the state of the Taylor cone. As a result, the liquid held by distal end 211*a* of discharge electrode 211 contracts.

That is, when the magnitude of the voltage applied to discharger 21 periodically varies depending on the drive frequency, the liquid held by discharge electrode 211 expands and contracts along the center axis of discharge electrode 211 (along the X-axis). Accordingly, an electric field is concentrated on a distal end (apex portion) of the Taylor cone, which leads development of discharge. Therefore, dielectric breakdown of air occurs in a state where the distal end of the Taylor cone is pointed. In synchronization with the drive frequency, therefore, discharge (full-scale dielectric breakdown discharge or partial dielectric breakdown discharge) occurs intermittently.

That is, the liquid held by discharge electrode 211 is subjected to a force of the electric field to form the Taylor cone. As a result, the electric field tends to concentrate between the distal end (vertex) of the Tailor cone and counter electrode 212. This generates relatively high-energy discharge between the liquid and counter electrode 212. Then, the corona discharge generated in the liquid held by discharge electrode 211 is developed to higher energy discharge. As a result, at at least a part between discharge electrode 211 and counter electrode 212, a discharge path in a state of dielectric breakdown can be formed intermittently.

Then, the liquid held by discharge electrode 211 is electrostatically atomized by the high-energy discharge. As a result, in effective component generation device 1 of the first exemplary embodiment, a nanometer-sized charged fine particle liquid containing OH radicals is generated. That is, the charged fine microparticle liquid as an effective component is generated in discharger 21. The generated charged fine particle liquid is discharged to the outside of case 3 through discharge port 31 of metal body 30 of case 3.

As described above, effective component generation device 1 of the first exemplary embodiment operates to release the generated charged fine particle liquid to the outside.

Next, the full-scale dielectric breakdown discharge and the partial breakdown discharge in the above-described discharge state will be described.

The full-scale dielectric breakdown discharge is a discharge state in which the corona discharge progresses to the full-scale dielectric breakdown between the pair of electrodes (discharge electrode 211 and counter electrode 212). That is, in the full-scale dielectric breakdown discharge, a discharge path entirely and dielectrically broken is formed between discharge electrode 211 and counter electrode 212.

The "dielectric breakdown" described in the present disclosure means that electrical insulation of an insulator (including gases such as air) separating conductors is broken, and the insulating state cannot be maintained. Specifically, in a case of dielectric breakdown of a gas, for example, ionized molecules are accelerated by an electric field and collide with other gas molecules, and ionize the other gas molecules. Then, the ion concentration suddenly increases to cause gas discharge, so that dielectric breakdown occurs.

On the other hand, the partial dielectric breakdown discharge is a discharge state in which a discharge path is formed by partial dielectric breakdown between the pair of electrodes (discharge electrode 211 and counter electrode 212) developed from the corona discharge. That is, in the partial dielectric breakdown discharge, a discharge path partially and dielectrically broken is formed between discharge electrode 211 and counter electrode 212. That is, a discharge path dielectrically broken is formed between discharge electrode 211 and counter electrode 212 not entirely but partially (locally). Thus, in the partial dielectric breakdown discharge, the discharge path formed between discharge electrode 211 and counter electrode 212 does not reach entire dielectric breakdown, but has partial dielectric breakdown.

However, in effective component generation device 1 according to the first exemplary embodiment, regardless of whether the discharge state is the full-scale dielectric breakdown discharge or the partial dielectric breakdown discharge, the dielectric breakdown between the pair of electrodes (discharge electrode 211 and counter electrode 212) is not continuously generated, but is intermittently generated. Therefore, a discharge current generated between the pair of electrodes (discharge electrode 211 and counter electrode 212) is also intermittently generated.

At this time, in a case where the power supply (drive circuit 23) does not have a current capacity required to maintain the discharge path, the voltage applied between the pair of electrodes decreases as soon as the corona discharge develops into the dielectric breakdown. Therefore, the discharge path is interrupted, and the discharge is stopped. Note that the "current capacity" indicates a capacity of current that can be released by the power supply in a unit time.

Then, the discharge current intermittently flows by repetition of generation and stop of the discharge. That is, the discharge state of effective component generation device 1 according to the first exemplary embodiment repeats a state where the discharge energy is high and a state where the discharge energy is low. In this respect, the discharge state of effective component generation device 1 is different from glow discharge and arc discharge in that the dielectric breakdown is continuously generated (discharge current is continuously generated).

As a result, effective component generation device 1 generates an effective component such as radicals with larger discharge energy in the full-scale dielectric breakdown discharge or the partial dielectric breakdown discharge than that in the corona discharge. Specifically, effective component generation device 1 according to the first exemplary embodiment generates a large amount of effective components which is about 2 to 10 times as large as that of the corona discharge. The effective components thus generated constitute a basis for exerting useful effects in various situations including sterile filtration, odor removal, moisture keeping, freshness keeping, and virus inactivation.

In addition, in the partial dielectric breakdown discharge, dissipation of an effective component due to excessive discharge energy can be suppressed as compared with that of the full-scale dielectric breakdown discharge. Therefore, the partial dielectric breakdown discharge can improve the generation efficiency of the effective component as compared with that of the full-scale dielectric breakdown discharge. That is, in the full-scale dielectric breakdown discharge, since discharge energy related to the discharge is too high, a part of the generated effective component dissipates. Therefore, in the full-scale dielectric breakdown discharge, there is a possibility that the generation efficiency of the effective component decreases.

On the other hand, in the partial breakdown discharge, the discharge energy related to the discharge is suppressed to be small as compared with that of the full-scale dielectric breakdown discharge. Therefore, in the partial dielectric breakdown discharge, it is possible to reduce the amount of effective component dissipated due to exposure to excessive discharge energy, and to improve the generation efficiency of the effective component.

Furthermore, in the partial dielectric breakdown discharge, concentration of an electric field is reduced as compared with that of the full-scale breakdown discharge. That is, in the full-scale dielectric breakdown discharge, a large discharge current momentarily flows between discharge electrode 211 and counter electrode 212 through a discharge path completely broken. Therefore, electric resistance at the time of the full-scale dielectric breakdown discharge becomes very small.

That is, in the partial dielectric breakdown discharge, a maximum value of the current instantaneously flowing between discharge electrode 211 and counter electrode 212 at the time of forming the discharge path partially dielectric broken down is suppressed to be smaller than that in the full-scale dielectric breakdown discharge. As a result, in the partial breakdown discharge, generation of nitride oxide (NOx) is suppressed as compared with that of the full-scale dielectric breakdown discharge. Further, in the partial breakdown discharge, generation of the electromagnetic noise is also suppressed.

(2.4) Detailed Configuration of Case

Figure 1B:
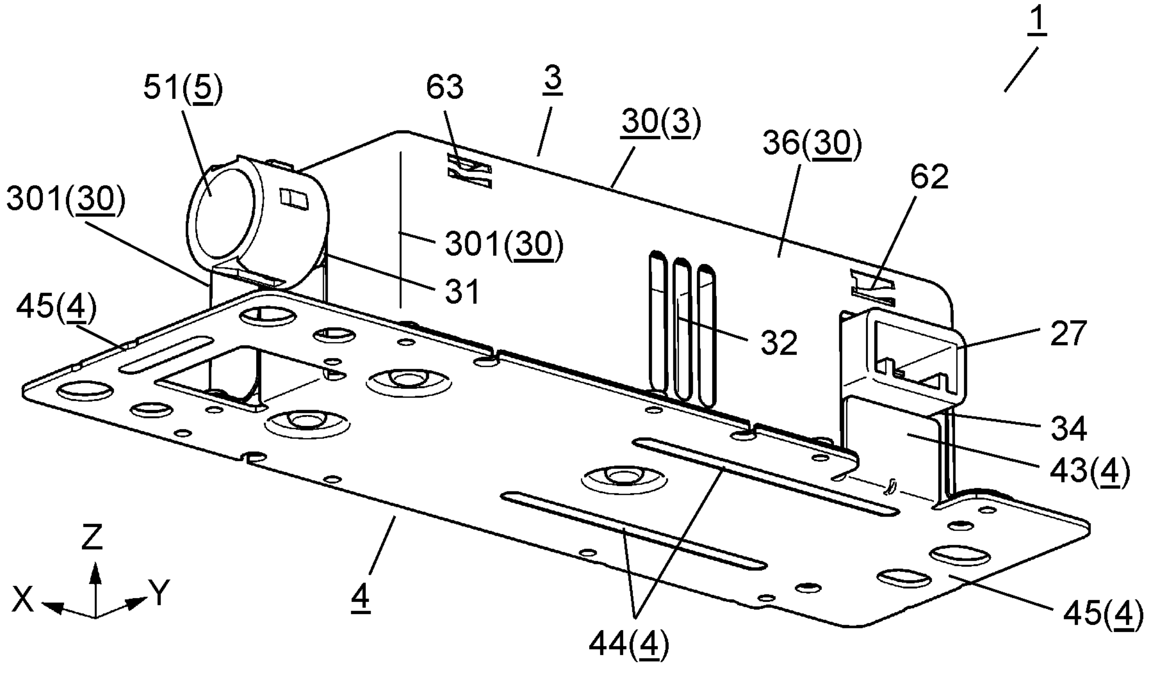
FIG. 1B is a perspective view of the effective component generation device as viewed from another direction.

Next, a more detailed configuration of case 3 will be described with reference to FIGS. 1A, 1B, and 4.

Case 3 is formed in a box-shaped rectangular parallelepiped shape having a dimension in the Y-axis direction smaller than a dimension in the X-axis direction and a dimension in the Z-axis direction smaller than a dimension in the Y-axis direction. Therefore, case 3 has a rectangular shape with the X-axis direction as the longitudinal direction and the Y-axis direction as the lateral direction in plan view (as viewed from the positive direction of the Z-axis).

Case 3 has an opening 33 that opens to a surface (peripheral wall 36) facing a negative direction of the Z-axis. In addition, case 3 has discharge port 31 formed on a surface (peripheral wall 36) facing the positive direction of the X-axis.

Further, case 3 has air supply port 32 and connector port 34 formed on a surface (peripheral wall 36) facing a positive direction of the Y-axis. Connector port 34 constitutes an opening for exposing connector 27 mounted on circuit board 230 to the outside of case 3. For example, an external circuit or the like is electrically connected to connector 27 exposed from connector port 34. Thus, drive circuit 23 is electrically connected to the external circuit via connector 27.

In the first exemplary embodiment, case 3 includes bottom plate 35, peripheral walls 36, flange 37, and the like. Peripheral walls 36 are provided so as to protrude from the outer peripheral edges of bottom plate 35 toward the negative direction of the Z-axis. Of bottom plate 35, a surface facing the positive direction of the Z-axis, that is, a surface surrounded by distal ends of peripheral walls 36 (a side of bottom plate 35) is bottom surface 310 of case 3 (see FIG. 4). F1*a* nge 37 is provided so as to protrude outward (in the X-axis and Y-axis directions) from the distal ends (a side of opening 33) of peripheral walls 36. Case 3 is joined to lid body 4 via flange 37.

The joining of case 3 and lid body 4 will be described in detail in the section of "(2.5) Joint structure of case and lid body".

Case 3 of the first exemplary embodiment includes metal body 30. That is, as described above, since case 3 is formed of a metal sheet, entire case 3 constitutes metal body 30. Metal body 30 has seamless portion 301 at a corner portion between two surfaces of adjacent peripheral walls 36 oriented in different directions (the X-axis direction and the Y-axis direction). Seamless portion 301 fills at least a part of a gap between the two surfaces of adjacent peripheral walls 36 at the corner portions.

In the first exemplary embodiment, metal body 30 corresponding to case 3 has a seamless structure. That is, in effective component generation device 1 of the first exemplary embodiment, internal components 2 including discharger 21 and drive circuit 23 is surrounded by metal body 30 of case 3. Therefore, metal body 30 functions as a shield against the electromagnetic noise generated in discharger 21, drive circuit 23, and the like.

When metal body 30 has a seamless structure, it is easy to suppress leakage of the electromagnetic noise to the outside of case 3. As a result, for example, at a time of occurrence of discharge in discharger 21, an influence of leakage of electromagnetic noise on peripheral devices of effective component generation device 1 can be reduced.

In addition, when metal body 30 has a seamless structure, entry of electrical noise into the inside of case 3 is easily suppressed. As a result, internal components 2 is less likely to be affected by electromagnetic noise generated around effective component generation device 1. As a result, measures against both electro magnetic interference (EMI) and electro magnetic susceptibility (EMS) can be implemented by metal body 30 of case 3. That is, the electromagnetic compatibility (EMC) measures can be implemented by metal body 30.

Furthermore, when metal body 30 has a seamless structure, electromagnetic noise in a frequency band of 50 kHz or more and 200 kHz or less can be reduced. More specifically, the present discloser and the like have confirmed that electromagnetic noise in a frequency band of 100 kHz or more and 160 kHz or less can be particularly reduced.

Specifically, metal body 30 corresponding to case 3 is formed in a box shape by drawing (rectangular cylindrical drawing) of a metal sheet. Therefore, in case 3 thus formed, not only corner portions between bottom plate 35 and peripheral walls 36, but also four corner portions of peripheral walls 36 positioned at four corners in plan view do not have joints. In other words, in the first exemplary embodiment, at least a gap at a corner portion between two adjacent surfaces of peripheral walls 36 oriented in different directions from each other is completely filled by seamless portion 301. For example, a gap at a corner portion between a surface of peripheral wall 36 facing the positive direction of the X-axis and a surface facing the positive direction of the Y-axis is filled with seamless portion 301. That is, peripheral walls 36 surrounding bottom surface 310 of case 3 are formed of one metal sheet continuously without a seam in a circumferential direction of bottom surface 310.

In general, in a case of forming a case in a box shape by bending a metal sheet, a gap is inevitably generated at a joint or the like of the bent metal sheet. On the other hand, case 3 of effective component generation device 1 of the first exemplary embodiment is formed by drawing a metal sheet. Therefore, the gap is filled with seamless portion 301. That is, as compared with a box-shaped case formed by bending a metal sheet, case 3 of the first exemplary embodiment can eliminate or reduce a gap generated at a corner portion between two surfaces of adjacent peripheral walls 36 oriented in different directions of metal body 30.

Metal body 30 of case 3 of the first exemplary embodiment further includes fixing portion 61. Fixing portion 61 is a portion for fixing internal components 2 to bottom surface 310 of bottom plate 35 of case 3. Since fixing portion 61 is formed integrally with metal body 30, the fixing portion is provided continuously with metal body 30 without a seam. Specifically, for internal components 2, circuit board 230 is fixed to fixing portion 61 by screw 71 and nut 72. As a result, internal components 2 are fixed to bottom surface 310 of case 3. That is, case 3 has fixing portion 61 that fixes circuit board 230 to bottom surface 310 of case 3.

Details will be described in the section of "(2.6) Fixing structure of internal component".

Fixing portion 61 is formed of a cylindrical portion protruding from bottom surface 310 of bottom plate 35 of metal body 30 of case 3 toward lid body 4. Fixing portion 61 is disposed at a central portion of bottom surface 310 of case 3. In the first exemplary embodiment, cylindrical fixing portion 61 is formed integrally with bottom plate 35 of metal body 30 by drawing (cylindrical drawing) bottom plate 35 of case 3. Therefore, formed fixing portion 61 does not form a seam with bottom plate 35. That is, no gap is generated between the fixing portion 61 and the bottom plate 35 over the entire circumference of the fixing portion 61. With such a configuration, bottom plate 35 that is a part of metal body 30 and fixing portion 61 are formed of one metal sheet continuously formed without a seam.

Case 3 further includes support portion 62. Support portion 62 has a function of supporting circuit board 230 included in drive circuit 23. Support portion 62 is formed integrally with one of peripheral walls 36 of case 3. In the first exemplary embodiment, a pair of support portions 62 is provided on a pair of inner side surfaces, of peripheral walls 36, facing each other in the Y-axis direction. The pair of support portions 62 is formed so as to protrude in directions approaching each other from portions of the pair of inner side surfaces facing each other.

Case 3 further includes restriction portion 63. Restriction portion 63 is disposed at a position between bottom surface 310 of bottom plate 35 of metal body 30 of case 3 and circuit board 230. Restriction portion 63 has a function of restricting movement of circuit board 230 in a direction approaching bottom surface 310. Restriction portion 63 is formed integrally with one of peripheral walls 36 of case 3. In the first exemplary embodiment, a pair of restriction portions 63 is provided on a pair of inner side surfaces of peripheral walls 36 facing each other in the Y-axis direction. The pair of restriction portions 63 is formed so as to protrude from portions of the pair of inner side surfaces facing each other in directions approaching each other.

That is, in the first exemplary embodiment, each of support portions 62 and restriction portions 63 is formed of a cut-and-bent portion of a metal sheet constituting metal body 30 of case 3. Specifically, first, two slits (lances) parallel to the X-axis are formed in parts of peripheral walls 36. Then, the portions between the two slits are bent and raised so as to protrude toward the inside of case 3. Thus, support portions 62 or restriction portions 63 are formed.

Fixing portion 61, support portion 62, and restriction portion 63 will be described in detail in the section of "(2.6) Fixing structure of internal components".

(2.5) Joint Structure of Case and Lid Body

Figure 6:
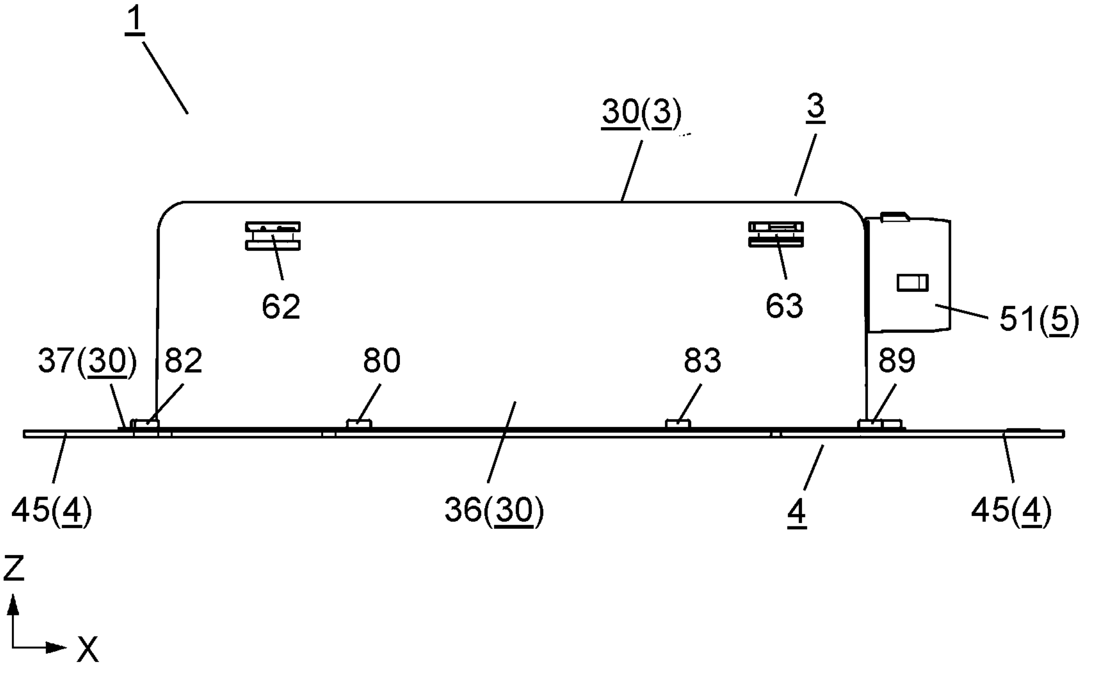
FIG. 6 is a side view of the effective component generation device.

Next, a joint structure between case 3 and lid body 4 will be described in detail with reference to FIGS. 6 and 7.

As described above, lid body 4 is joined to case 3 so as to close opening 33 in a state where internal components 2 are housed between lid body 4 and case 3. In the first exemplary embodiment, case 3 and lid body 4 are joined to each other via flange 37 of case 3 protruding outward from the distal ends of peripheral walls 36. That is, in plan view, case 3 and lid body 4 are joined to each other at a plurality of joints located in flange 37 around opening 33. In the first exemplary embodiment, two metal sheets (flange 37 of case 3 and lid body 4) overlapped with each other in the Z-axis direction are joined by caulking via a plurality of joints, for example, by dowel caulking or the like in a state of being brought into close contact with each other. That is, each of the plurality of joints constitutes a caulked joint. Accordingly, a gap between case 3 and lid body 4 can be reduced. As a result, electromagnetic noise leaking from the gap can be more effectively reduced.

Specifically, the plurality of joints are disposed in flange 37 of case 3 so as to be aligned in the circumferential direction along the outer peripheral edge of bottom plate 35 in plan view. The plurality of joints are disposed on four sides of flange 37 so as to surround bottom plate 35 of case 3 from four sides. In the first exemplary embodiment, as an example, 10 joints 80 to 89 including first joint 81, second joint 82, third joint 83, and fourth joint 84 are provided. Note that a plurality of joints will be simply referred to as "joints" except for individually describing the joints.

Figure 7:
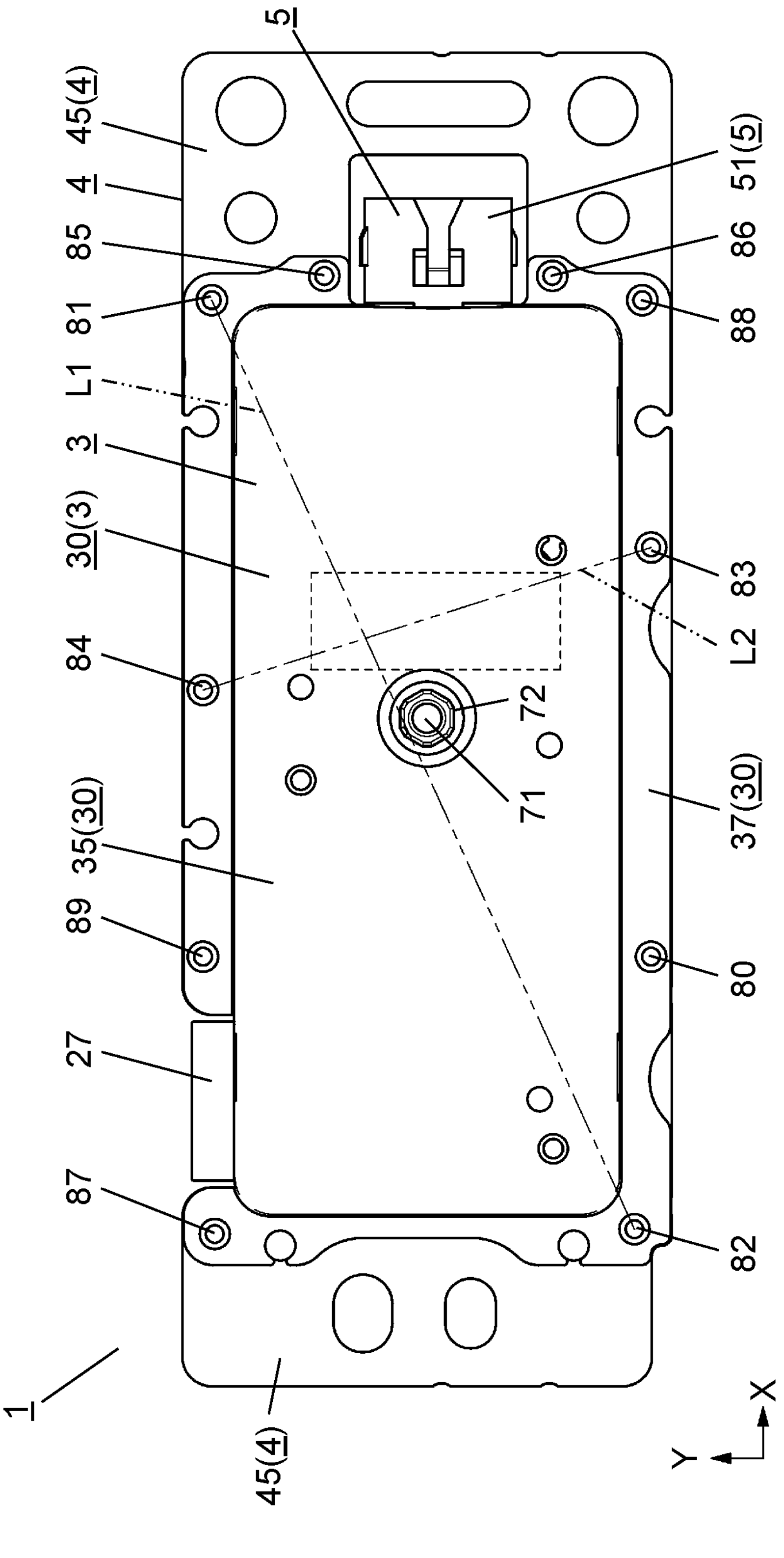
FIG. 7 is a plan view of the effective component generation device.

As illustrated in FIG. 7, each of first joint 81 and second joint 82 is disposed at a corner portion of opening 33 of metal body 30 as well as a position of flange 37 on a diagonal line of opening 33 in plan view. Third joint 83 and fourth joint 84 are disposed on flange 37 on both sides in the Y-axis direction as well as at positions not facing opening 33 of metal body 30 in the X-axis direction.

Fifth joint 85 and sixth joint 86 are disposed on both sides of flange 37 in the Y-axis direction with respect to nozzle 51 in plan view. Each of seventh joint 87 and eighth joint 88 is disposed at a corner portion of opening 33 of metal body 30 as well as at a position of flange 37 on a diagonal line of opening 33 in plan view. Seventh joint 87 and eighth joint 88 are disposed to face first joint 81 and second joint 82, respectively, in the Y-axis direction. Ninth joint 89 and tenth joint 80 are disposed on both sides in the Y-axis direction so as to face opening 33 of metal body 30.

The plurality of joints 80 to 89 of the first exemplary embodiment include corner joints disposed at flange 37 at the corner portions of opening 33. That is, among ten joints 80 to 89, four of first joint 81, second joint 82, seventh joint 87, and eighth joint 88 constitute a corner joint. That is, the four corner joints (first joint 81, second joint 82, seventh joint 87, and eighth joint 88) are disposed at the four corner positions of flange 37. As a result, even when the four corners of flange 37 are caught in a manufacturing step, an assembling step, or the like of effective component generation device 1, the corner joints prevent flange 37 from curling. As a result, it is possible to prevent a gap between case 3 and lid body 4 from being widened due to curling.

Here, as illustrated in FIG. 7, first straight line L1 connecting first joint 81 and second joint 82 and second straight line L2 connecting third joint 83 and fourth joint 84 are assumed. First straight line L1 and second straight line L2 are both virtual lines and are not substantive. First straight line L1 and second straight line L2 intersect each other in opening 33 of case 3 in plan view.

That is, in the first exemplary embodiment, case 3 and lid body 4 are joined to each other via the plurality of joints 80 to 89 formed at positions of flange 37 around opening 33 and including first joint 81, second joint 82, third joint 83, and fourth joint 84. First straight line L1 connecting first joint 81 and second joint 82 and second straight line L2 connecting third joint 83 and fourth joint 84 intersect each other in opening 33.

Furthermore, first straight line L1 and second straight line L2 pass over buffer 41 in plan view. More specifically, an intersection of first straight line L1 and second straight line L2 is located on buffer 41 when viewed from one side (the positive direction of the Z-axis) of the joining direction between case 3 and lid body 4 in plan view. That is, the positional relationship among buffer 41, and first joint 81, second joint 82, third joint 83, and fourth joint 84 is set so as to satisfy the above conditions.

Therefore, buffer 41 is compressed by being sandwiched between lid body 4 and a part of internal components 2 (air blower 22) in a state where lid body 4 is joined to case 3. Then, internal components 2 are pressed against bottom surface 310 of case 3 by the elastic force of buffer 41. Accordingly, at the time of joining case 3 and lid body 4, lid body 4 receives a reaction force from buffer 41.

At this time, a gap may be generated between the peripheral edge (flange 37) of opening 33 of case 3 and lid body 4 by the reaction force from buffer 41. Therefore, in the first exemplary embodiment, the positional relationship among buffer 41 and first joint 81, second joint 82, third joint 83, and fourth joint 84 is determined as described above. With such a configuration, a portion of lid body 4 that is brought into contact with buffer 41 can be reliably pressed.

That is, in lid body 4, two tensions act on buffer 41. One of the tensions is a tension generated when lid body 4 is joined to case 3 via first joint 81 and second joint 82. The other tension is tension generated by joining lid body 4 to case 3 via third joint 83 and fourth joint 84. As a result, the reaction force received from buffer 41 by lid body 4 is suppressed, and floating of lid body 4 due to the reaction force, or deformation of lid body 4 due to the reaction force is suppressed. As a result, a gap is hardly generated between the peripheral edge (flange 37) of opening 33 of case 3 and lid body 4.

(2.6) Fixing Structure of Internal Components

Next, details of a fixing structure of internal components 2 to case 3 will be described with reference to FIGS. 8A to 10.

In the first exemplary embodiment, as described above, fixing portion 61, support portions 62, and restriction portions 63 are formed in case 3.

Figure 8A:
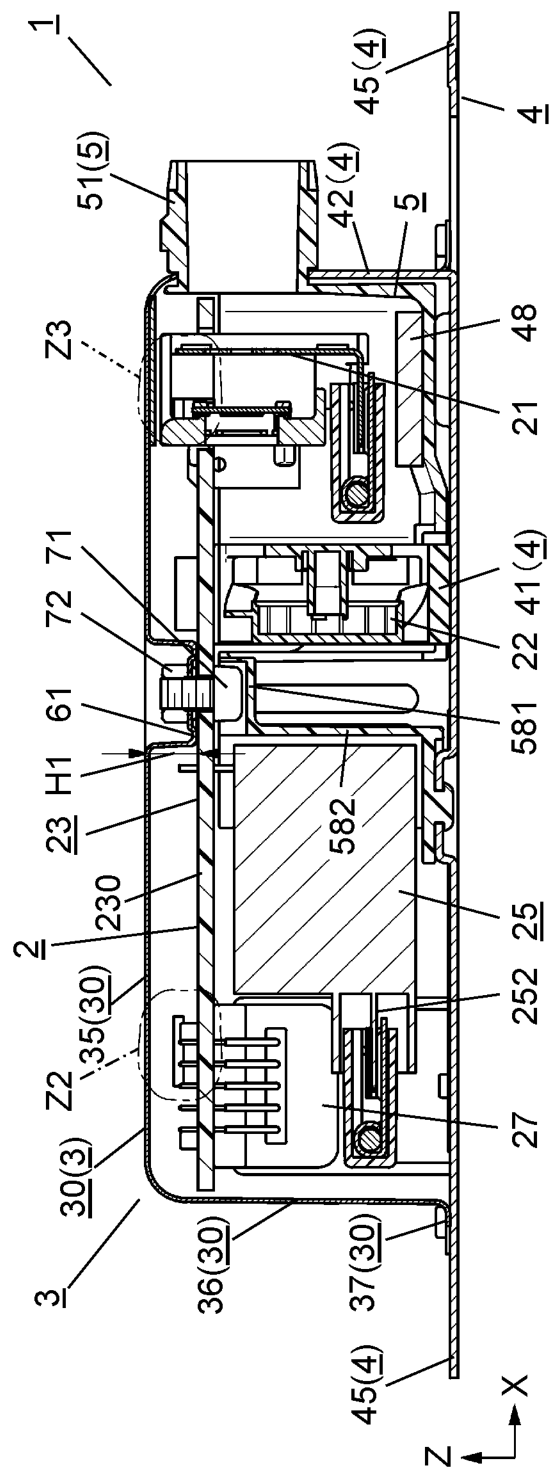
FIG. 8A is a cross-sectional view of the effective component generation device.

As illustrated in FIG. 8A, in internal components 2, circuit board 230 is fixed to fixing portion 61 by screw 71 and nut 72. As a result, circuit board 230 is fixed to bottom surface 310 of bottom plate 35 of metal body 30 of case 3.

Fixing portion 61 is formed integrally with bottom plate 35 of case 3 by drawing (cylindrical drawing) so as to protrude from bottom surface 310 of case 3 toward lid body 4 (in the negative direction of the Z-axis). In internal components 2, a central portion of circuit board 230 is fixed to fixing portion 61. Thus, circuit board 230 is fixed to case 3.

Figure 8B:
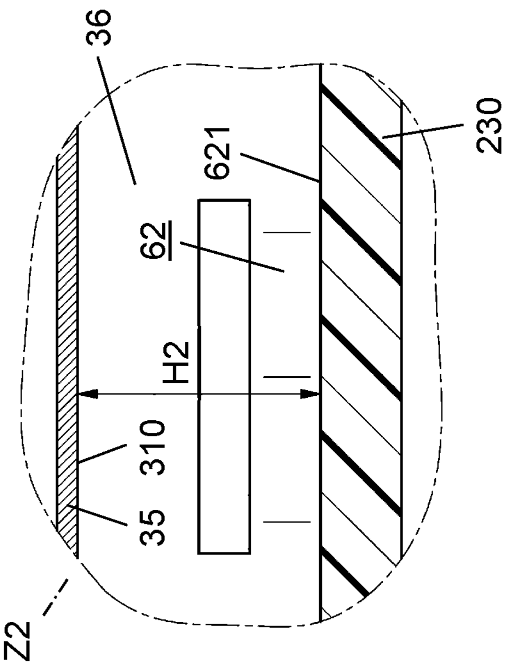
FIG. 8B is a schematic view illustrating a configuration of a support portion in region Z2 in FIG. 8A.

As illustrated in FIG. 8B, support portion 62 is in contact with circuit board 230 from one side (positive direction of the Z-axis) in a thickness direction of circuit board 230. Thus, support portion 62 supports circuit board 230. Support portion 62 is provided at a position between bottom surface 310 of case 3 and circuit board 230 in the Z-axis direction. That is, support portion 62 supports circuit board 230 by coming into contact with the opposing surface of circuit board 230 facing bottom surface 310 of case 3.

Support portion 62 includes connecting portion 621 and is formed integrally with metal body 30. Connecting portion 621 is electrically connected to the reference potential point (ground) by being in contact with circuit board 230. Specifically, circuit board 230 has conductive pad 231 (see FIG. 9) serving as a reference potential point on a part of an opposing surface facing bottom surface 310 of case 3.

Conductive pad 231 is formed by, for example, solder. Connecting portion 621 of support portion 62 is in contact with conductive pad 231 of circuit board 230. As a result, the reference potential point of drive circuit 23 and connecting portion 621 are electrically connected. Further, conductive pad 231 of the first exemplary embodiment also protects and reinforces a contact portion of circuit board 230 with support portions 62.

In the first exemplary embodiment, fixing portion 61 is also formed integrally with metal body 30 similarly to support portions 62. Fixing portion 61 is also electrically connected to the reference potential point (ground) by contact with circuit board 230. That is, since circuit board 230 is fixed to fixing portion 61 by screw 71 and nut 72, the circuit board is brought into contact with not only support portions 62 and connecting portion 621 but also fixing portion 61. Therefore, conductive pad 231 serving as the reference potential point is formed not only at a portion in contact with support portions 62 and connecting portion 621 but also at a portion in contact with fixing portion 61 in the opposing surface facing bottom surface 310 of case 3 of circuit board 230. That is, fixing portion 61 is electrically connected to the reference potential point of drive circuit 23 by contact with conductive pad 231. Further, conductive pad 231 also protects and reinforces a contact portion of circuit board 230 with fixing portion 61.

Figure 9:
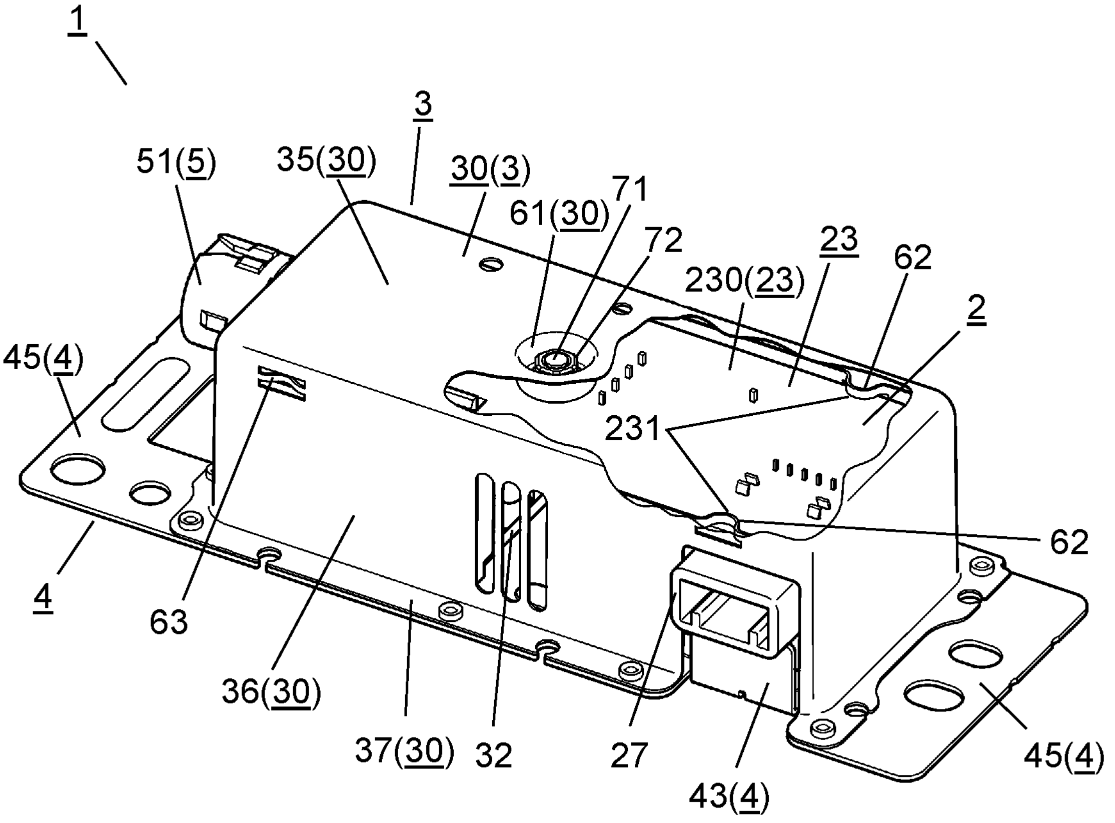
FIG. 9 is a perspective view illustrating the effective component generation device in a partially broken state.

The pair of support portions 62 is provided on peripheral walls 36 facing each other, of case 3 in the Y-axis direction. Therefore, as illustrated in FIG. 9, circuit board 230 is supported by bottom surface 310 of bottom plate 35 of case 3 at three points of one fixing portion 61 and the pair of support portions 62. Metal body 30 included in case 3 is electrically connected to the reference potential point (ground) of drive circuit 23 at three points of one fixing portion 61 and the pair of support portions 62. In particular, in the first exemplary embodiment, conductive pad 231 with which at least one support portion 62 is in contact is disposed in a vicinity of the power supply portion (connector 27) of circuit board 230. Therefore, a potential of metal body 30 is easily stabilized. This makes it easy to suppress generation of the electromagnetic noise that is likely to occur due to potential fluctuation.

As illustrated in FIG. 8A, fixing portion 61 is formed at a position where a height (the negative direction of the Z-axis) from bottom surface 310 of case 3 is lower than a position where connecting portion 621 is formed. That is, height H1 (see FIG. 8A) of fixing portion 61 from bottom surface 310 of case 3 is set slightly lower than height H2 (see FIG. 8B) of connecting portion 621 from bottom surface 310 of case 3 (H1<H2). Due to the above dimensional relationship, circuit board 230 easily comes into contact with connecting portion 621 with an appropriate contact pressure in a state where circuit board 230 is fixed to fixing portion 61.

Figure 8C:
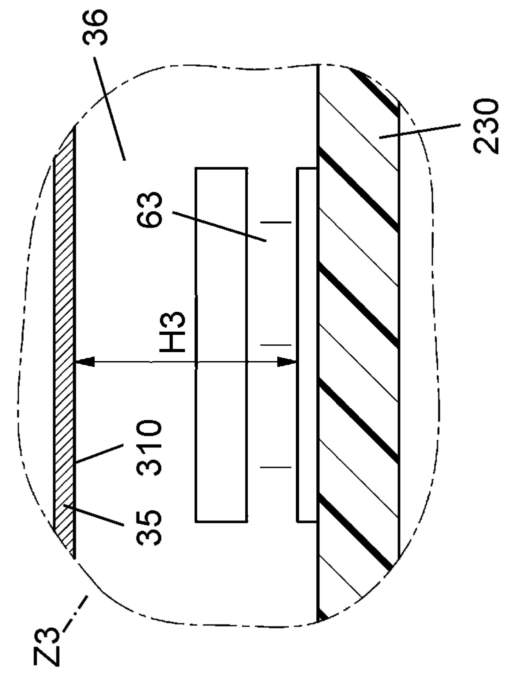
FIG. 8C is a schematic view illustrating a configuration of a restriction portion in region Z3 in FIG. 8A.

As illustrated in FIG. 8C, restriction portions 63 are disposed between bottom surface 310 of case 3 and circuit board 230 in the Z-axis direction. However, unlike support portions 62, restriction portions 63 are disposed with a gap from circuit board 230. Therefore, restriction portions 63 are basically not in contact with circuit board 230. However, when warpage or the like occurs in circuit board 230, for example, restriction portions 63 come into contact with circuit board 230 from one side (the positive direction of the Z-axis) in the thickness direction of circuit board 230. As a result, further movement (warpage) of circuit board 230 in a direction approaching bottom surface 310 of metal body 30 is restricted. That is, when warpage or the like occurs in circuit board 230, restriction portions 63 come into contact with the opposing surface of circuit board 230 facing bottom surface 310 of case 3 to restrict the movement of circuit board 230. In the first exemplary embodiment, similarly to support portions 62, restriction portions 63 are also formed integrally with metal body 30 constituting case 3.

Here, restriction portions 63 each are formed at a position where a height (the negative direction of the Z-axis) from bottom surface 310 of case 3 is lower than a forming position of fixing portion 61. That is, height H3 (see FIG. 8C) of restriction portion 63 from bottom surface 310 of case 3 is set slightly lower than height H1 (see FIG. 8A) of fixing portion 61 from bottom surface 310 of case 3 (H3<H1). Due to the above dimensional relationship, a gap is secured between each of restriction portions 63 and circuit board 230 in a normal state where no warpage or the like occurs in circuit board 230.

Figure 10:
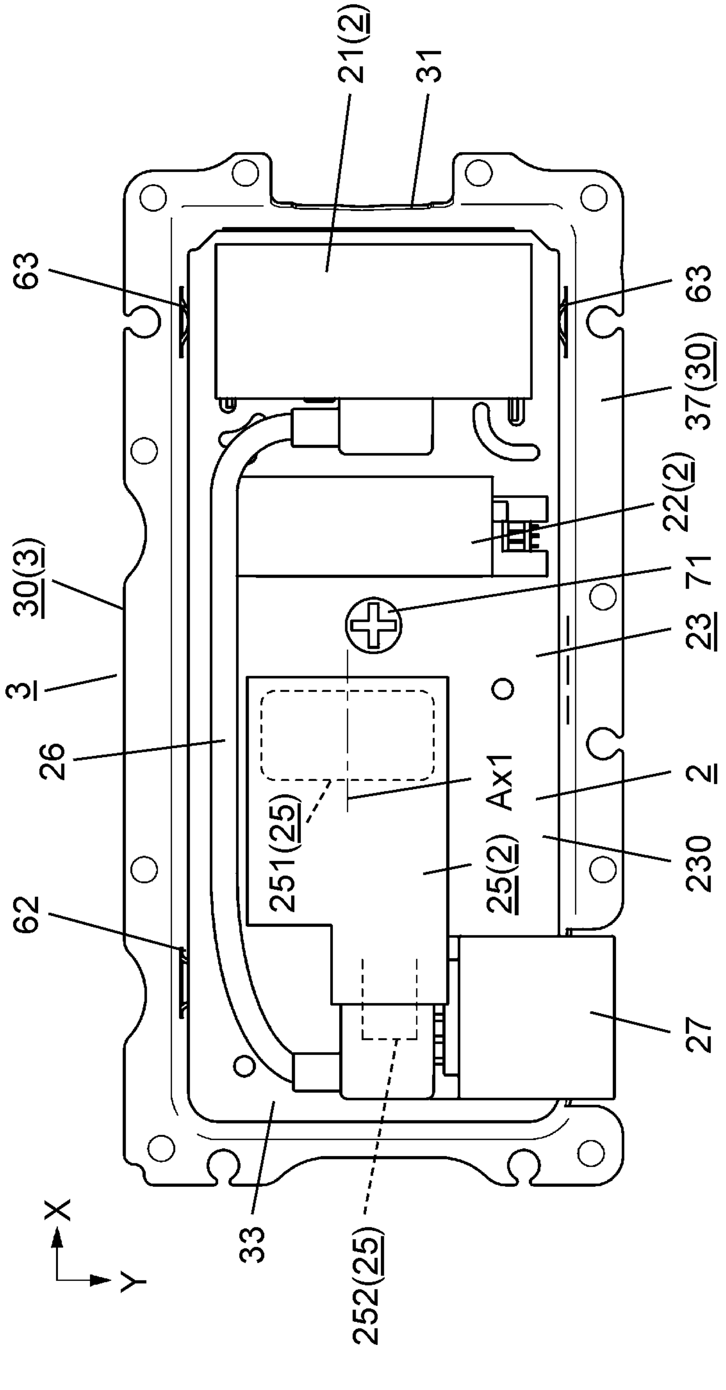
FIG. 10 is a plan view illustrating the case and internal components of the effective component generation device.

As illustrated in FIG. 10, transformer 25 included in drive circuit 23 includes coiled portion 251 and connection terminal 252 connected to discharger 21. Discharger 21 and connection terminal 252 are disposed at positions opposite to each other as viewed from coiled portion 251 in the X-axis direction.

Transformer 25 includes coiled portion 251 formed of a conductive wire wound around central axis Axl and connection terminal 252 as the secondary terminal. Central axis Axl of coiled portion 251 is along the X-axis.

Transformer 25 boosts the input voltage from the power supply by coiled portion 251. Transformer 25 then outputs the boosted voltage as an application voltage from connection terminal 252, which is the secondary terminal, to discharger 21. That is, connection terminal 252 is electrically connected to discharger 21 via harness 26.

Further, transformer 25 is mounted on circuit board 230 in a direction in which discharger 21 and connection terminal 252 are located on opposite sides as viewed from coiled portion 251. Specifically, when viewed from coiled portion 251, discharger 21 is located in the positive direction of the X-axis, and connection terminal 252 is located in the negative direction of the X-axis. In other words, connection terminal 252, coiled portion 251, and discharger 21 are disposed in this order in the positive direction along the X-axis (central axis Axl of coiled portion 251). That is, coiled portion 251 is disposed between connection terminal 252 and discharger 21 in the positive direction along the X-axis (central axis Axl of coiled portion 251). Harness 26 is routed between transformer 25 and peripheral walls 36 of metal body 30 to connect connection terminal 252 and discharger 21.

As a result, coiled portion 251 of transformer 25 can be disposed in a vicinity of the central portion of circuit board 230. As a result, coiled portion 251 of transformer 25 is disposed away from peripheral walls 36 of case 3 by a certain distance or more.

Here, coiled portion 251 may be a generation source of the electromagnetic noise at the time of boosting in drive circuit 23. However, by disposing coiled portion 251 away from peripheral wall 36 of case 3, leakage of the electromagnetic noise to the outside of case 3 (metal body 30) can be easily suppressed. In particular, in central axis Axl of coiled portion 251, connection terminal 252 is interposed between coiled portion 251 and peripheral walls 36 of case 3. Accordingly, a distance between coiled portion 251 and peripheral walls 36 of case 3 can be increased. As a result, leakage of the electromagnetic noise to the outside of case 3 (metal body 30) can be more easily suppressed.

Note that, in addition to coiled portion 251 of transformer 25, it is preferable to have a configuration in which, for example, a component such as an inductor that can be a main generation source of the electromagnetic noise is also disposed in the vicinity of the central portion of circuit board 230. That is, it is preferable that a component serving as a generation source of the electromagnetic noise is disposed in case 3 at a position away from peripheral walls 36 of case 3 by a certain distance or more.

(2.7) Air Passage Member

Next, air passage member 5 housed in case 3 will be described in detail with reference to FIGS. 11 to 13.

FIG. 13 is a schematic view for explaining an internal structure of air passage member 5. In FIG. 13, internal components 2 (discharger 21 and air blower 22) are indicated by an imaginary line (two-dot chain line). Furthermore, in FIG. 13, each of air supply passage R1 and air discharge passage R2 is shaded (dot-hatched).

Here, as an example, air passage member 5 is made of a synthetic resin material such as polybutylene terephthalate (PBT).

In addition, in the first exemplary embodiment, air passage member 5 and nozzle 51 are integrally configured as an integrated molded product. Furthermore, air passage member 5 is fixed to lid body 4 by a method such as thermal caulking.

Air passage member 5 is formed as a hollow structure. Accordingly, air passage R10 is formed inside air passage member 5. As illustrated in FIG. 11, an outer shape of air passage member 5 is formed in a rectangular parallelepiped shape whose dimension in the Y-axis direction is smaller than the dimension in the X-axis direction and whose dimension in the Z-axis direction is smaller than the dimension in the Y-axis direction. Therefore, air passage member 5 has a rectangular shape with the X-axis direction as a longitudinal direction and the Y-axis direction as a lateral direction in plan view (as viewed from the positive direction of the Z-axis). Air passage member 5 is housed between case 3 and lid body 4. Therefore, the outer shape of air passage member 5 is set to a size smaller than that of case 3.

Air passage member 5 is housed in case 3 together with internal components 2 in a state where a surface (upper surface) opposite to lid body 4 in the Z-axis direction is brought into contact with circuit board 230, or opposed to circuit board 230 with a slight gap (see FIG. 8A). That is, in a state where air passage member 5 is housed in case 3 together with internal components 2, the surface of air passage member 5 facing the positive direction of the Z-axis abuts on circuit board 230. In the first exemplary embodiment, air passage member 5 has an opening formed in a surface facing the positive direction of the Z-axis and an opening in a surface facing the negative direction of the Z-axis. However, these openings of air passage member 5 are covered with circuit board 230 or lid body 4 when air passage member 5 is housed in case 3. Accordingly, in the first exemplary embodiment, air passage member 5 forms air passage R10 through which air flow F1 passes in case 3 where air passage member 5 is to be housed, together with circuit board 230 or lid body 4 but not with air passage member 5 alone.

In the first exemplary embodiment, air passage member 5 has a plurality of (for example, two) dowels 584 (see FIG. 11) formed on a surface opposite to lid body 4 in the Z-axis direction. In addition, tips of dowels 584 come into contact with circuit board 230. With such a configuration, a gap (corresponding to a height of dowel 584) is ensured between the surface of air passage member 5 opposite to lid body 4 in the Z-axis direction and circuit board 230.

Figure 12:
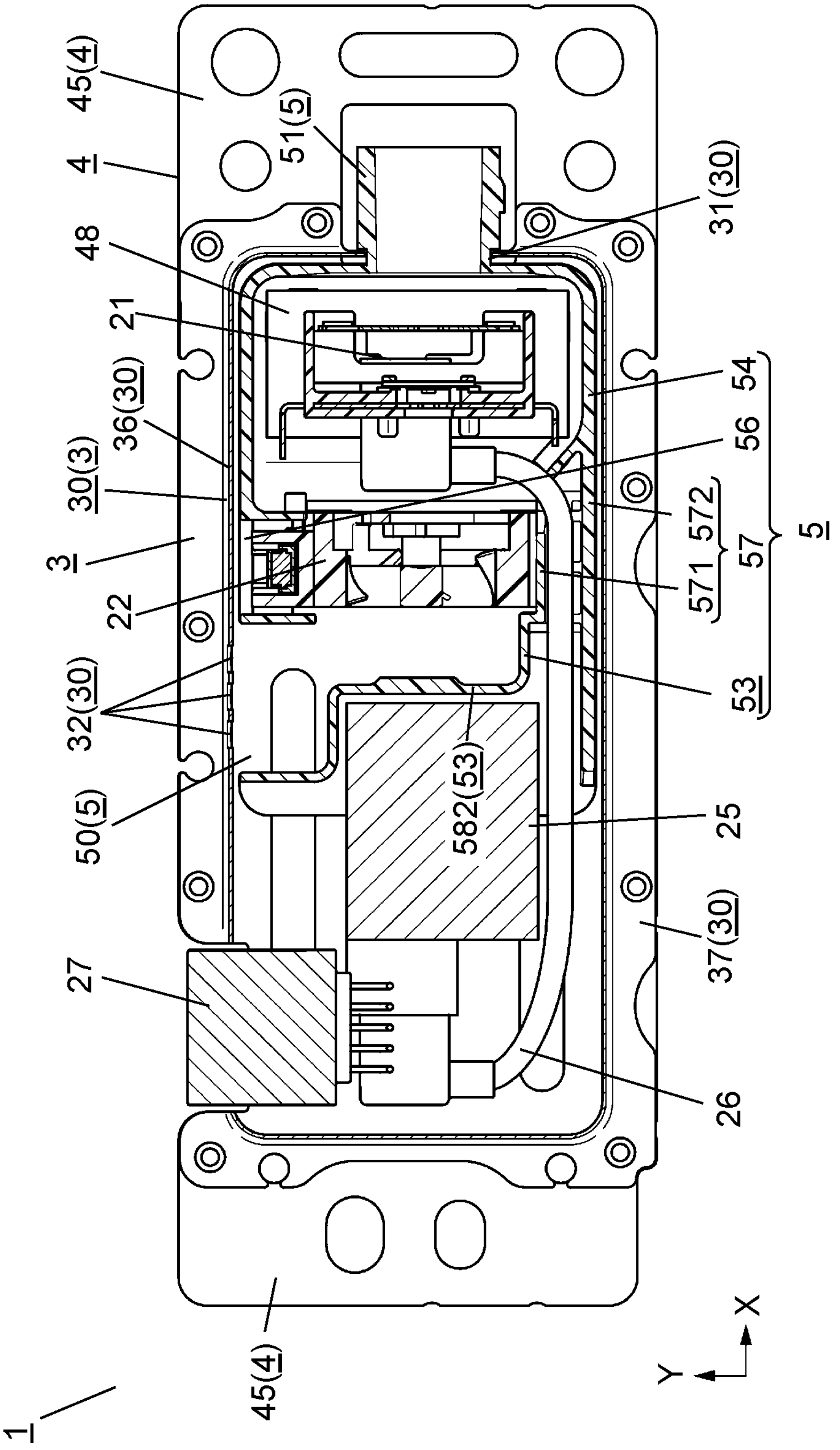
FIG. 12 is a cross-sectional view of the effective component generation device as viewed from a positive side of a Z-axis.

Furthermore, as illustrated in FIG. 12, air passage member 5 includes nozzle 51 integrally provided on a surface facing the positive direction of the X-axis. Furthermore, air passage member 5 has introduction port 50 formed on a surface facing the positive direction of the Y-axis. Nozzle 51 is formed in a cylindrical shape, for example, and is disposed in discharge port 31 of case 3 as described above.

Introduction port 50 is disposed at a position facing air supply port 32 of case 3. Introduction port 50 forms a port (opening) for taking air into air passage R10 in air passage member 5.

Air passage member 5 is housed in case 3 together with internal components 2 with a small gap in a state where introduction port 50 faces a portion of the inner side surface of case 3 where air supply port 32 is formed. As a result, the air taken into case 3 from air supply port 32 is taken into air passage member 5 from introduction port 50, and moves to nozzle 51 through air passage R10 in air passage member 5. Then, the moved air is discharged from discharge port 31 to the outside of case 3 through nozzle 51. That is, air flow F1 taken in from air supply port 32 and discharged from discharge port 31 is straightened by air passage member 5. As a result, air flow F1 for efficiently carrying an effective component can be generated by air passage member 5.

Furthermore, in the first exemplary embodiment, air passage member 5 includes upstream block 53 and downstream block 54. Furthermore, air passage member 5 includes caulked portions 55 described above (see FIG. 2), coupling portion 56, and wire passing portion 57.

Coupling portion 56 connects upstream block 53 and downstream block 54. As a result, upstream block 53 and downstream block 54 are integrated. That is, air passage member 5 of the first exemplary embodiment is formed as an integrally molded product. Therefore, a plurality of elements such as upstream block 53, downstream block 54, and coupling portion 56 included in air passage member 5 is also integrated as an integrally molded product. That is, in the first exemplary embodiment, upstream block 53 and downstream block 54 are integrally molded and are in an integrally inseparable relationship.

Upstream block 53, downstream block 54, and coupling portion 56 of air passage member 5 are arranged in the positive direction of the X-axis in an order of upstream block 53, coupling portion 56, and downstream block 54. That is, air passage member 5 is disposed such that upstream block 53 is located on the negative side of the X-axis as viewed from coupling portion 56 and downstream block 54 is located on the positive side of the X-axis as viewed from coupling portion 56.

Furthermore, coupling portion 56 is formed as a hollow structure. Therefore, air supply passage R1 in upstream block 53 and air discharge passage R2 in downstream block 54 are connected through the inside of coupling portion 56. That is, air passage R10 formed by air passage member 5 includes an inner space of coupling portion 56 in addition to air supply passage R1 and air discharge passage R2.

Furthermore, coupling portion 56 houses air blower 22. That is, air blower 22 mounted on circuit board 230 is disposed inside coupling portion 56 in a state where air passage member 5 is housed in case 3 together with internal components 2. Accordingly, air passage member 5 has an opening into which air blower 22 is inserted formed on at least a surface of coupling portion 56 facing the positive direction of the Z-axis (see FIG. 11). Accordingly, air blower 22 of internal components 2 is disposed in the middle of air passage R10 formed by air passage member 5.

At this time, air blower 22 is housed in coupling portion 56 such that a rotation axis of the fan coincides with the direction (X-axis direction) in which upstream block 53 and downstream block 54 are arranged. Here, in the first exemplary embodiment, the fan of air blower 22 is an axial fan that generates air flow F1 along the rotation axis of the fan. The rotation axis of the fan of air blower 22 is disposed parallel to the X-axis. As a result, air flow F1 flows in a direction along the X-axis. Furthermore, the rotation direction of the fan of air blower 22 is defined such that air blower 22 generates air flow F1 flowing in the positive direction of the X-axis. Therefore, air flow F1 is generated such that air flows from upstream block 53 toward downstream block 54 by operation of air blower 22.

As described above, upstream block 53 forms air supply passage R1 on the upstream side when viewed from air blower 22. Air supply passage R1 constitutes a part of air passage R10 through which air flow F1 generated by air blower 22 passes, and generated air flow F1 flows from air supply port 32 of case 3 toward discharge port 31. That is, upstream block 53 is disposed on an upstream side of air flow F1 when viewed from coupling portion 56, that is, on a side of air supply port 32 from which air flow F1 flows, and forms air supply passage R1 on an upstream side of coupling portion 56. Specifically, air supply passage R1 connects between air supply port 32 formed in case 3 and air blower 22. As a result, the air taken in from air supply port 32 passes through air supply passage R1 and reaches air blower 22.

More specifically, introduction port 50 of air passage member 5 is formed on a surface of upstream block 53 facing the positive direction of the Y-axis. Then, upstream block 53 takes air into air supply passage R1 from introduction port 50 facing air supply port 32 of case 3. Specifically, as illustrated in FIG. 13, air supply passage R1 is formed as an air passage having a substantially L shape (including an L shape) in plan view (as viewed from the positive direction of the Z-axis). As a result, air supply passage R1 discharges air taken in from an inlet (corresponding to introduction port 50) facing the positive direction of the Y-axis from an outlet (an opening facing air blower 22) facing the positive direction of the X-axis.

That is, air passage member 5 also forms air passage R10 (air supply passage R1) between air supply port 32 and air blower 22. Accordingly, air passage member 5 can efficiently supply air from the outside of case 3 to air blower 22.

Here, in effective component generation device 1 according to the first exemplary embodiment, generation efficiency and activeness of an effective component generated by discharger 21 may be affected by atmosphere (temperature and/or humidity) around discharger 21. However, air taken in from the outside of case 3, rather than air inside case 3 heated by internal components 2 or the like, can be more reliably sent to discharger 21 through air supply passage R1. Therefore, effective component generation device 1 of the first exemplary embodiment can suppress a decrease in generation efficiency of an effective component due to influence of atmosphere (temperature and/or humidity) around discharger 21.

Furthermore, as described above, downstream block 54 forms air discharge passage R2 on a downstream side when viewed from air blower 22. Air discharge passage R2 constitutes a part of air passage R10 through which air flow F1 generated in air blower 22 passes, and generated air flow F1 flows from air supply port 32 of case 3 toward discharge port 31. That is, downstream block 54 is disposed on the downstream side of air flow F1 as viewed from coupling portion 56, that is, on a side closer to discharge port 31 to which air flow F1 flows out, and forms air discharge passage R2 on a downstream side of coupling portion 56. Specifically, air discharge passage R2 connects between air blower 22 and discharge port 31. As a result, the air sent out from air blower 22 reaches discharge port 31 through air discharge passage R2.

More specifically, nozzle 51 integrally molded with air passage member 5 is formed on a surface of downstream block 54 facing the positive direction of the X-axis. Then, downstream block 54 discharges the air in air discharge passage R2 from nozzle 51 disposed in discharge port 31 of case 3. Specifically, as illustrated in FIG. 13, air discharge passage R2 is formed as an air passage having a substantially linear shape (including a linear shape) in plan view (as viewed from the positive direction of the Z-axis). As a result, air discharge passage R2 discharges air taken in from an inlet (the opening facing air blower 22) facing the negative direction of the X-axis from an outlet (corresponding to nozzle 51) facing the positive direction of the X-axis.

Furthermore, downstream block 54 houses discharger 21. That is, discharger 21 mounted on circuit board 230 is disposed inside downstream block 54 in a state where air passage member 5 is housed in case 3 together with internal components 2. Therefore, air passage member 5 has an opening for inserting discharger 21 therein formed on at least a surface facing the positive direction of the Z-axis in downstream block 54 (see FIG. 11). Accordingly, discharger 21 of internal components 2 is disposed in the middle of air passage R10 formed by air passage member 5. In particular, by housing discharger 21 in downstream block 54, discharger 21 is disposed on the downstream side of air blower 22 in air passage R10, that is, in air discharge passage R2.

Here, as described above, the opening formed on at least one surface of air passage member 5 in the Z-axis direction is covered with circuit board 230 or lid body 4. Accordingly, air passage member 5 forms air passage R10 together with circuit board 230 or lid body 4 in case 3.

In the first exemplary embodiment, an opening is formed on a side of lid body 4 in upstream block 53, and an opening is formed on a side of circuit board 230 in downstream block 54. That is, in air supply passage R1 formed by upstream block 53, one surface of air supply passage R1 is covered with lid body 4. In air discharge passage R2 formed in downstream block 54, one surface of air discharge passage R2 is covered with circuit board 230.

In other words, air supply passage R1 is separated from circuit board 230 by air passage member 5 (board-side partition wall 582 described later). On the other hand, air discharge passage R2 is separated from lid body 4 by air passage member 5. Accordingly, it is not essential to provide an undercut portion in air passage member 5. Therefore, in a step of manufacturing air passage member 5, a mold structure can be simplified. In addition, in air discharge passage R2, adsorption of a charged effective component to metal lid body 4 can be suppressed. Accordingly, release efficiency of the effective component can further be improved.

Furthermore, in order to efficiently release the effective component from discharge port 31, air passage member 5 adopts a characteristic for making air flow F1 generated in air blower 22 and the flow of the effective component smooth. Specifically, a round (R) shape is adopted at each of corner portions of an inner surface of air passage member 5 (inner peripheral surface of air passage R10). As a result, generation of turbulence at each of corner portions is suppressed, and smooth flow of air flow F1 and the effective component is achieved.

Furthermore, as described above, an air passage having a substantially linear shape (including a linear shape) in plan view (as viewed from the positive direction of the Z-axis) is applied to air discharge passage R2. As a result, the air sent out from air blower 22 is efficiently discharged from discharge port 31. That is, air flow F1 passing through air discharge passage R2 is controlled in the X-axis direction. As a result, air flow F1 that releases the effective component straight from discharge port 31 is likely to occur, and the effective component is more likely to be blown away farther by air flow F1. Air passage member 5 is formed of a resin molded article. Therefore, the seamless structure can be adopted while increasing a cross-sectional area of entire air passage R10 as much as possible. As a result, air leakage and the like can be suppressed to be reduced by the seamless structure.

Caulked portions 55 of air passage member 5 are respectively provided on surfaces of upstream block 53 and downstream block 54 facing the negative direction of the Z-axis (see FIG. 3).

Wire passing portion 57 of air passage member 5 holds harness 26 (electric wire) electrically connected to internal components 2. Wire passing portion 57 is disposed to an outside of air passage R10 in case 3. That is, air passage member 5 includes wire passing portion 57 for holding harness 26 not inside but outside of air passage R10 (air supply passage R1 and air discharge passage R2), and holds harness 26 outside of air passage R10. As a result, heat generated by harness 26 is less likely to affect air flow F1 (and the effective component) passing through air passage R10.

That is, as illustrated in FIG. 12, wire passing portion 57 of the first exemplary embodiment is disposed at a position on a negative side of the Y-axis with respect to upstream block 53 and coupling portion 56 in plan view (as viewed from the positive direction of the Z-axis). In other words, wire passing portion 57 is provided at a position on the side of air supply passage R1 formed by upstream block 53. Wire passing portion 57 further includes a pair of walls 571 and 572 facing each other in the Y-axis direction. In the first exemplary embodiment, one wall 571 of the pair of walls 571 and 572 constitutes a part of coupling portion 56. Other wall 572 is located on a side opposite to air blower 22 as viewed from the one wall 571. Wire passing portion 57 allows harness 26 to pass between the pair of walls 571 and 572. As a result, the pair of walls 571 and 572 hold harness 26 while restricting the movement of harness 26.

Furthermore, as described above, harness 26 held by wire passing portion 57 electrically connects transformer 25 of drive circuit 23 and discharger 21. That is, one end of harness 26 is connected to discharger 21 housed in downstream block 54. Specifically, as illustrated in FIG. 12, harness 26 is drawn into downstream block 54 (air discharge passage R2) through cutout 541 formed in a part of downstream block 54 so as to connect between wire passing portion 57 and air discharge passage R2.

Figure 11:
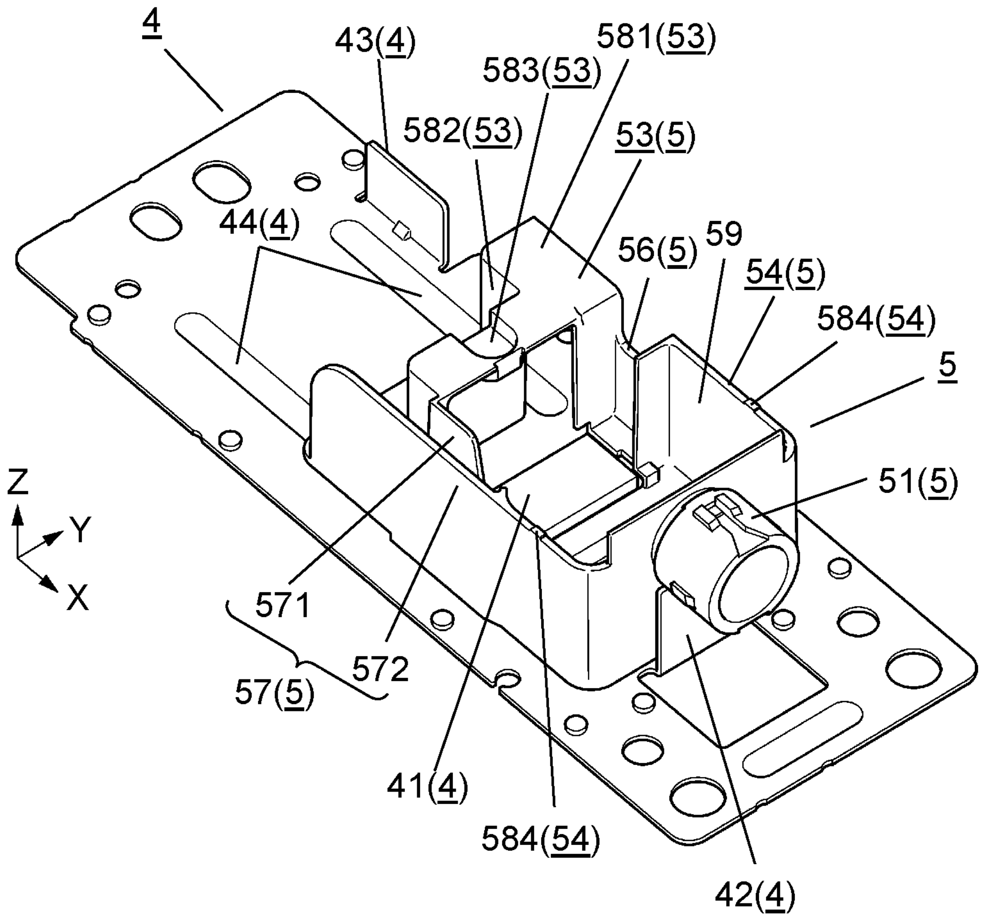
FIG. 11 is a perspective view illustrating the lid body and the air passage member of the effective component generation device.

As illustrated in FIG. 11, air passage member 5 of the first exemplary embodiment includes board-side partition wall 581 and partition wall 582. Board-side partition wall 581 separates circuit board 230 included in drive circuit 23 from at least a part of air passage R10. That is, board-side partition wall 581 is provided so as to cover at least a part of the inner space (air passage R10) of air passage member 5 from the positive side of the Z-axis. Partition wall 582 is provided so as to protrude in the negative direction of the Z-axis from at least a part of the outer peripheral edge of board-side partition wall 581. Partition wall 582 separates at least one heat generating component included in internal components 2 from at least a part of air passage R10.

Board-side partition wall 581 is included in upstream block 53. In other words, a part of upstream block 53 also has a function as board-side partition wall 581. Board-side partition wall 581 constitutes an upper surface of air supply passage R1 (a surface on the positive side of the Z-axis), and is provided so as to face lid body 4 across air supply passage R1. Air passage member 5 is housed in case 3 together with internal components 2 in a state where board-side partition wall 581 is in contact with circuit board 230 or faces circuit board 230 with a slight gap. Therefore, at least board-side partition wall 581 is disposed between air supply passage R1 and circuit board 230 in a state where air passage member 5 is housed in case 3. As a result, air supply passage R1 is separated from circuit board 230 by board-side partition wall 581 without being disposed directly opposite to circuit board 230.

Further, board-side partition wall 581 has recess 583 formed in a portion corresponding to fixing screw 71 of circuit board 230. With such a configuration, in a state where air passage member 5 is housed in case 3, air passage member 5 is prevented from interfering with screw 71 by recessed portion 583. That is, board-side partition wall 581 can also separate air supply passage R1 and screw 71 (see FIG. 8A).

Partition wall 582 is included in upstream block 53. In other words, a part of upstream block 53 also has a function as partition wall 582. Partition wall 582 constitutes a side surface of air supply passage R1. As illustrated in FIG. 12, air passage member 5 is housed in case 3 together with internal components 2 in a state where partition wall 582 faces transformer 25 that is a heat generating component with a slight gap. Therefore, at least partition wall 582 is positioned between air supply passage R1 and the heat generating component (transformer 25) in a state where air passage member 5 is housed in case 3. Accordingly, air supply passage R1 is separated from the heat generating component (transformer 25) by partition wall 582 without being disposed directly opposite to the heat generating component (transformer 25).

As described above, board-side partition wall 581 and partition wall 582 separate at least a part of air passage R10 from circuit board 230, the heat generating component (such as transformer 25), as well as screw 71, and the like. As a result, heat generated by circuit board 230, the heat generating component (transformer 25), screw 71, and the like hardly affects air flow F1 (and the effective component) passing through air passage R10. That is, board-side partition wall 581 and partition wall 582 can prevent the air heated by heat generated by the heat generating component such as circuit board 230 and transformer 25 from flowing into air passage R10. As a result, it is possible to suppress a decrease in generation efficiency of the effective component.

Furthermore, air passage member 5 makes it difficult for heat generated by harness 26, circuit board 230, the heat generating component (transformer 25), screw 71, and the like to affect air flow F1 passing through air passage R10. As a result, it is also possible to suppress a decrease in generation efficiency of liquid due to dew condensation supplied to discharger 21. That is, when the temperature of air flow F1 rises, dew condensation in discharger 21 is less likely to occur. Therefore, the generation efficiency of liquid due to dew condensation decreases. Therefore, the temperature rise of air flow F1 is suppressed by air passage member 5 of the first exemplary embodiment. This makes it easy to suppress a decrease in liquid generation efficiency due to dew condensation.

In the first exemplary embodiment, air passage member 5 includes sound attenuating chamber 59 (see FIG. 11) formed to house discharger 21. Sound attenuating chamber 59 reduces a discharge sound in discharger 21 generated when the effective component is generated by using a resonance phenomenon. Sound attenuating chamber 59 is formed across upstream block 53, coupling portion 56, and downstream block 54. That is, an inner space formed by upstream block 53 including air supply passage R1, coupling portion 56, and downstream block 54 including air discharge passage R2 functions as sound attenuating chamber 59.

That is, effective component generation device 1 according to the first exemplary embodiment causes sound attenuating chamber 59 formed in air passage member 5 to function as an acoustic tube. As a result, the discharge sound generated in discharger 21 is reduced using the resonance phenomenon of sound attenuating chamber 59. In discharger 21, a sound called a discharge sound may be generated along with intermittent discharge. Therefore, the generated discharge sound is reduced in sound attenuating chamber 59 formed by air passage member 5. This makes it possible to achieve silencing of effective component generation device 1.

To be more specific, as illustrated in FIG. 13, air passage member 5 has a pair of wall surfaces 591 and 592 that opposedly face each other with discharger 21 interposed therebetween in the X-axis direction as inner side surfaces of sound attenuating chamber 59. At this time, distance D1 between the pair of wall surfaces 591 and 592 facing each other with discharger 21 interposed therebetween in sound attenuating chamber 59 is expressed by the following formula (1) using a wavelength) of the discharge sound and an integer n.

$$D1 \approx (1/4+n/2) \times \lambda \quad (1)$$

Here, "≈" in the formula (1) means that the values are substantially equal to each other, allowing an error of ±5%. Therefore, the above formula (1) can also be rewritten as "D1=(1/4+n/2)×λ±5%". The "wavelength of the discharge sound" in the present disclosure is a dominant wavelength of the discharge sound. At this time, in a case where the discharge sound includes sounds having a plurality of frequency components, the "wavelength of the discharge sound" corresponds to the reciprocal of the frequency of a dominant sound among the sounds, that is, a sound having the highest intensity.

Therefore, in the first exemplary embodiment, as an example, it is assumed that a discharge sound around 2 kHz is generated in discharger 21. In this case, if the sound velocity is 340 m/s, the wavelength) of the discharge sound of 2 kHz is 170 mm. Therefore, distance D1 between the pair of wall surfaces 591 and 592 is designed to be 43.5 mm based on the above formula (1).

That is, in a case where air passage member 5 is regarded as an acoustic tube, by satisfying the above formula (1), the discharge sound is reflected between the pair of wall surfaces 591 and 592, and a resonance phenomenon in which the incident wave and the reflected wave have phases opposite to each other occurs in the acoustic tube. As a result, the incident wave and the reflected wave cancel each other inside air passage member 5. Therefore, an effect of reducing the discharge sound leaking from air passage member 5 to the outside is expected.

In particular, in the first exemplary embodiment, the pair of wall surfaces 591 and 592 are disposed so as to face each other in the flowing direction of air flow F1. That is, in order to cause the resonance phenomenon, the pair of wall surfaces 591 and 592 set to distance D1 are disposed so as to face each other in the X-axis direction that is the flowing direction of air flow F1. In other words, the inner side surfaces of the wall portions of air passage member 5 on both sides in the X-axis direction are referred to as wall surface 591 and wall surface 592, respectively. As a result, a resonance phenomenon can be caused between upstream-side wall surface 591 and downstream-side wall surface 592 of air passage R10. As a result, the incident wave and the reflected wave cancel each other, and the discharge sound can be reduced.

Effective component generation device 1 according to the first exemplary embodiment further includes sound attenuating member 48 (see FIG. 13) as a countermeasure against the discharge sound. Sound attenuating member 48 is disposed at a position facing discharger 21 at a position surrounded by air passage member 5. Specifically, sound attenuating member 48 is formed in a plate shape. Sound attenuating member 48 is attached to a surface of downstream block 54 of air passage member 5 facing discharger 21. That is, sound attenuating member 48 is positioned in the negative direction of the Z-axis as viewed from discharger 21, and is disposed to face discharger 21 with a gap (see FIG. 8A). That is, sound attenuating member 48 is disposed at a position facing discharger 21 and hardly obstructing the flow of air flow F1.

Sound attenuating member 48 is formed of, for example, a cushion material such as polyethylene foam, ethylene propylene diene rubber (EPDM) foam, or polyurethane foam, a sponge, a porous member, or the like. Sound attenuating member 48 made of the above material absorbs and reduces the discharge sound generated in discharger 21. As a result, an effect of reducing the discharge sound leaking from air passage member 5 to the outside is expected. Furthermore, as a material of sound attenuating member 48, a member having excellent sound absorption characteristics for a frequency component near the frequency (for example, 2 kHz) of the discharge sound is more preferable.

(2.8) Manufacturing Method

Hereinafter, a method for manufacturing effective component generation device 1 described above will be described.

The method for manufacturing effective component generation device 1 basically includes each step of manufacturing internal components 2, case 3, and lid body 4, respectively, and a step of assembling them.

In the step of manufacturing internal components 2, first, circuit board 230 and the like are manufactured. This step is performed in a step of mounting components (such as transformer 25) constituting drive circuit 23, discharger 21, air blower 22, liquid supply unit 24, connector 27, and the like on circuit board 230.

In the step of manufacturing lid body 4, first, lid body 4 is prepared. This step is performed by fixing buffer 41 and air passage member 5 to lid body 4.

Further, a case manufacturing step of manufacturing case 3 is executed in a step of manufacturing box-shaped case 3 by performing drawing (rectangular cylindrical drawing) on the metal sheet. In the case manufacturing step, it is possible to manufacture case 3 having a seamless structure in which a seam is not formed not only at the corner portions between bottom plate 35 and peripheral walls 36 but also at the four corner portions of peripheral walls 36 positioned at the four corners in plan view.

In the step of assembling internal components 2, case 3, and lid body 4, first, a step of housing internal components 2 in case 3 and joining case 3 and lid body 4 is executed.

In the housing step of housing internal components 2 in case 3, first, internal components 2 configured by mounting discharger 21, air blower 22, and the like on circuit board 230 is housed in case 3. Next, a step of fixing circuit board 230 to fixing portion 61 with screw 71 and nut 72 is executed. As a result, internal components 2 are fixed to bottom surface 310 of bottom plate 35 of case 3.

That is, the method for manufacturing effective component generation device 1 according to the first exemplary embodiment includes the case manufacturing step and the housing step.

As described above, effective component generation device 1 includes internal components 2 and case 3. Internal components 2 include discharger 21 that generates an effective component. Case 3 is formed in a box shape having discharge port 31 through which an effective component is discharged, and houses internal components 2. The case manufacturing step is a step of forming case 3 by drawing a metal sheet. The housing step is a step of housing internal components 2 in case 3.

As described above, effective component generation device 1 according to the first exemplary embodiment is formed by integrating upstream block 53 forming air supply passage R1 and downstream block 54 forming air discharge passage R2. As a result, a number of components of air passage member 5 is suppressed, and the assemblability of effective component generation device 1 is improved. Further, nozzle 51 is also formed integrally with air passage member 5. As a result, as compared with a case where nozzle 51 is a separate body, a number of components of effective component generation device 1 can be suppressed, and the assemblability of effective component generation device 1 is improved.

Furthermore, by integrally forming a plurality of elements (upstream block 53, downstream block 54, and nozzle 51) of effective component generation device 1, it is possible to suppress the occurrence of forgetting to set some of the plurality of elements. In particular, by forming nozzle 51 integrally with air passage member 5, for example, even if air passage member 5 is left unassembled, it is obvious that air passage member 5 is left unassembled in appearance. Therefore, it is possible to suppress the occurrence of defective products due to forgetting to assemble a part of effective component generation device 1.

(3) Modifications

The first exemplary embodiment is merely one of various exemplary embodiments of the present disclosure. If the purpose ofthe present disclosure can be achieved, the first exemplary embodiment can be variously modified according to the design and the like. The drawings referred to in the present disclosure are all schematic views. Therefore, the ratio of the size and thickness of each component in the drawings does not necessarily reflect the actual dimension ratio. Hereinafter, modifications of the first exemplary embodiment will be listed. The modifications described below can be applied in appropriate combination.

That is, in the first exemplary embodiment, the application of effective component generation device 1 has been described by taking the in-vehicle application as an example, but the present invention is not limited thereto. Effective component generation device 1 may be used for, for example, a refrigerator, a washing machine, a dryer, an air conditioner, an electric fan, an air purifier, a humidifier, or a facial treatment device used in a house or an office.

In addition, in the first exemplary embodiment, an example has been described in which the seamless structure of metal body 30 is achieved by forming case 3 by drawing, but the present invention is not limited thereto. That is, effective component generation device 1 may have a configuration in which at least a part of the gap is closed by seamless portion 301 so as to reduce the gap between the two surfaces of adjacent peripheral walls 36 at the corner portion of metal body 30. For example, at the corner portion of metal body 30, the gap between the two surfaces of adjacent peripheral walls 36 may be welded or filled with a metal sheet, a metal tape, a metal plate, a metal paste, or the like to achieve seamless portion 301. In this case, even in case 3 formed in a box shape by bending a metal sheet, seamless portion 301 may be achieved by filling at least a part of a gap generated at a joint or the like of the bent metal sheet by the above method.

In addition, in the first exemplary embodiment, an example in which entire case 3 is formed of metal body 30 has been described, but the present invention is not limited thereto. That is, the fact that entire case 3 is metal body 30 is not an essential configuration of effective component generation device 1. For example, only a part of case 3 may be formed of metal body 30 made of metal. Specifically, case 3 may be configured in a form including the metal body and the resin molded article by integrating the metal body and the resin molded article by, for example, insert molding or the like. Alternatively, case 3 may be formed by forming a metal body on the surface of the resin molded article by a method such as metal plating or attaching a metal sheet to the resin molded article.

Further, in the first exemplary embodiment, an example in which buffer 41 is formed of ethylene propylene diene rubber (EPDM) foam has been described, but buffer 41 may be formed of a cushion material such as polyurethane foam. Furthermore, buffer 41 may be achieved by a member having elasticity, such as a rubber member, a polyurethane member, a sponge, or a spring member (including a leaf spring), in addition to the cushion material. Even in these cases, buffer 41 is pressed against a part of internal components 2 (for example, air blower 22) by the elasticity of buffer 41.

In the first exemplary embodiment, the configuration in which buffer 41 is in contact with air blower 22 of internal components 2 has been described as an example, but the present invention is not limited thereto. For example, buffer 41 may be sandwiched between lid body 4 and a part of internal components 2. Therefore, for example, buffer 41 may be sandwiched between transformer 25 that is a part of internal components 2 and lid body 4. In this case, transformer 25 is pressed against bottom surface 310 of bottom plate 35 of case 3 by the elastic force of buffer 41. As a result, effects such as retention stability can be obtained.

In the first exemplary embodiment, the configuration in which corresponding metal body 30 of case 3 has seamless portion 301 has been described as an example, but seamless portion 301 is not an essential configuration for effective component generation device 1. Therefore, metal body 30 without seamless portion 301 may be used.

In the first exemplary embodiment, by way of example, air passage member 5 is made of polybutylene terephthalate (PBT), but the present disclosure is not limited to the first exemplary embodiment. Air passage member 5 may be made of, for example, another synthetic resin such as SPS or a member at least partially made of metal.

In the first exemplary embodiment, air blower 22 only needs to be disposed between air supply passage R1 and air discharge passage R2, so that effective component generation device 1 does not necessarily have the configuration in which coupling portion 56 houses air blower 22.

In the first exemplary embodiment, discharger 21 only needs to be located at a position surrounded by air passage member 5, so that downstream block 54 housing discharger 21 is not an essential configuration for effective component generation device 1. That is, discharger 21 only needs to be disposed in the middle of air passage R10 formed by air passage member 5, and may be housed in upstream block 53, for example. In this case, discharger 21 is disposed on the upstream side of air blower 22 in air passage R10, that is, on air supply passage R1.

In the first exemplary embodiment, the configuration in which partition wall 582 is separated from transformer 25 has been described as an example, but the present disclosure is not limited thereto. Heat generating components other than transformer 25, for example, electronic components such as a transistor (including an electric field effect transistor), a diode, a resistor, and a capacitor, and other components may be separated from at least a part of air passage R10. Furthermore, since partition wall 582 only needs to separate the heat generating component from at least a part of air passage R10, the configuration is not limited to the configuration in which a part of upstream block 53 functions as partition wall 582. For example, a part of downstream block 54 may function as partition wall 582, and partition wall 582 may separate air discharge passage R2 from the heat generating component. In this case, partition wall 582 makes it easy to suppress the influence of the heat generated by the heat generating component on the atmosphere around discharger 21. As a result, the release efficiency of the effective component can be further improved.

Similarly to partition wall 582, board-side partition wall 581 only needs to separate circuit board 230 from at least a part of air passage R10, and thus is not limited to the configuration in which a part of upstream block 53 functions as board-side partition wall 581. For example, a part of downstream block 54 may function as board-side partition wall 581, and air discharge passage R2 may be separated from circuit board 230 by board-side partition wall 581. In this case, the influence of the heat generated in circuit board 230 on the atmosphere around discharger 21 is easily suppressed by board-side partition wall 581. As a result, the release efficiency of the effective component can be further improved.

In the first exemplary embodiment, an example in which discharge electrode 211 and counter electrode 212 are made of a titanium alloy (Ti alloy) has been described, but the present invention is not limited thereto. For example, as an example, a copper alloy such as a copper-tungsten alloy (Cu—W alloy) may be used. As a result, an effect such as cost reduction can be obtained.

In the first exemplary embodiment, the tip of discharge electrode 211 is tapered. Alternatively, the tip of discharge electrode may be bulged. As a result, an effect such as an increase in the holding amount of dew condensation water can be obtained.

Further, in the first exemplary embodiment, the case where the high voltage applied from drive circuit 23 to discharger 21 is about 6.0 kV has been described as an example, but the present invention is not limited thereto. The voltage is preferably appropriately set according to, for example, the shapes of discharge electrode 211 and counter electrode 212, or the distance between discharge electrode 211 and counter electrode 212.

The fixing structure of internal components 2 is not limited to the structure described in the first exemplary embodiment. In the first exemplary embodiment, for example, the configuration in which circuit board 230 is fixed to fixing portion 61 using the fasteners such as screw 71 and nut 72 has been described as an example, but the present invention is not limited thereto. For example, it may be achieved by caulking, bonding, snap-fitting, or the like. The bonding includes bonding using an adhesive or an adhesive tape.

In the first exemplary embodiment, case 3 and lid body 4 are joined to each other by caulking. However, the present disclosure is not limited to this. For example, welding, joining using a fastener, bonding, or the like may be used. In the case of joining using a fastener, joining using a screw, a rivet, or the like is included. Further, even in a case of welding other than caulking, it is preferable to join case 3 and lid body 4 by welding the plurality of joints 80 to 89 positioned around opening 33 as in the first exemplary embodiment.

In the first exemplary embodiment, air passage member 5 and lid body 4 are joined to each other by thermal caulking, but the present disclosure is not limited to the first exemplary embodiment. For example, welding, joining using a fastener, bonding, or the like may be used. In the case of joining using a fastener, joining using a screw, a rivet, or the like is included. Further, air passage member 5 may be integrally formed with lid body 4 by insert-molding lid body 4 as an insert product. As a result, effects such as improvement in assemblability can be obtained.

In the first exemplary embodiment, the shape of lid body 4 has been described as a rectangular shape in which the X-axis direction is the longitudinal direction and the Y-axis direction is the lateral direction in plan view (as viewed from the positive direction of the Z-axis). However, the present disclosure is not limited to this, and can be modified as appropriate. As an example, lid body 4 may have, for example, a square shape, a circular shape, a polygonal shape (pentagonal shape or more), an oval shape, or the like in plan view. Similarly, the size, material, and the like of lid body 4 can be changed as appropriate. Further, lid body 4 may not include at least one of first closing piece 42, second closing piece 43, rib 44, and overhanging portion 45 described in the first exemplary embodiment. As a result, an effect such as cost reduction can be obtained.

In the first exemplary embodiment, there has been described the shape (outer shape) of air passage member 5 as the rectangular parallelepiped shape in which the dimension in the Y-axis direction is smaller than the dimension in the X-axis direction and the dimension in the Z-axis direction is smaller than the dimension in the Y-axis direction, as an example. However, the present invention is not limited thereto, and can be appropriately changed. As an example, air passage member 5 may have, for example, a square shape, a circular shape, a polygonal shape (pentagonal shape or more), an oval shape, or the like in plan view (as viewed from the positive direction of the Z-axis). Further, air passage member 5 may have a shape in which the dimension in the X axis direction and the dimension in the Y axis direction are equal in plan view, or may have a shape in which the dimension in the Y axis direction is larger than the dimension in the X axis direction. Similarly, the size, material, and the like of air passage member 5 can be changed as appropriate. Further, air passage member 5 may not include at least one of caulked portion 55, coupling portion 56, wire passing portion 57, and dowel 584 described in the first exemplary embodiment. As a result, effects such as stronger connection can be obtained.

In the first exemplary embodiment, the configuration in which the electric connection between the reference potential point of drive circuit 23 and metal body 30 is achieved by the contact between support portions 62 (connecting portion 621) and fixing portion 61, and conductive pad 231 of drive circuit 23 has been described as an example. However, the present disclosure is not limited to this. For example, the reference potential point of drive circuit 23 and metal body 30 may be connected by a member such as a lead wire, a harness, or a screw to achieve electrical connection between the reference potential point of drive circuit 23 and metal body 30. As a result, an effect such as cost reduction can be obtained.

In the first exemplary embodiment, the configuration including liquid supply unit 24 has been described as an example. However, liquid supply unit 24 is not an essential component of effective component generation device 1, and thus may be omitted as appropriate. In this case, discharger 21 is configured to generate an effective component such as negative ions by discharge (full-scale dielectric breakdown discharge or partial dielectric breakdown discharge) generated between discharge electrode 211 and counter electrode 212. As a result, an effect such as cost reduction can be obtained.

In the first exemplary embodiment, liquid supply unit 24 configured to cool discharge electrode 211 to generate dew condensation water has been described as an example. However, the present disclosure is not limited to the first exemplary embodiment. Liquid supply unit 24 may be configured to supply liquid from a tank to discharge electrode 211 by using a capillary phenomenon or a supply mechanism such as a pump, for example. As a result, an effect such as cost reduction can be obtained. Furthermore, the liquid is not limited to water (including dew condensation water), and may be a liquid other than water, for example, a functional liquid having a sterilizing effect.

In addition, in the first exemplary embodiment, the configuration has been described as an example in which drive circuit 23 applies a high voltage between discharge electrode 211 and counter electrode 212 with discharge electrode 211 as a negative electrode (ground) and counter electrode 212 as a positive electrode, but the present disclosure is not limited thereto. For example, a high voltage may be applied between the electrodes with discharge electrode 211 as a positive electrode and counter electrode 212 as a negative electrode (ground). Furthermore, the object of the present disclosure can be achieved as long as a potential difference (voltage) is generated between discharge electrode 211 and counter electrode 212. Therefore, drive circuit 23 may be configured such that the electrode on the high potential side (positive electrode) is set to the ground, the electrode on the low potential side (negative electrode) is set to the negative potential, and a negative voltage is applied to discharger 21. This can reduce the risk of electric shock caused by touching the electrode on the high potential side.

In the comparison between the two values in the first exemplary embodiment, "equal to or more than" includes both a case where the two values are equal to each other and a case where one of the two values exceeds the other. However, the present disclosure is not limited to this definition, and "more than or equal to" herein may be synonymous with "more than" including only the case where one of the two values exceeds the other. That is, whether or not the case where the two values are equal to each other is included can be arbitrarily changed depending on setting of a threshold value or the like. Therefore, there is no technical difference between "more than or equal to" and "more than". Similarly, "less than" may be synonymous with "equal to or less than".

Second Exemplary Embodiment

Hereinafter, effective component generation device 1A according to a second exemplary embodiment will be described with reference to FIGS. 14A to 15B.

As illustrated in FIGS. 14A to 15B, effective component generation device 1A according to the second exemplary embodiment is different from effective component generation device 1 according to the first exemplary embodiment in that it includes shield wall 46. Hereinafter, common reference numerals denote the same constituent elements as those of the first exemplary embodiment, and descriptions of the constituent elements will be omitted as appropriate.

Shield wall 46 of effective component generation device 1A is provided on lid body 4, and is disposed in case 3 at a position overlapping discharger 21 when viewed from discharge port 31. In other words, shield wall 46 is disposed at a position between discharger 21 and discharge port 31 in plan view.

Figure 14A:
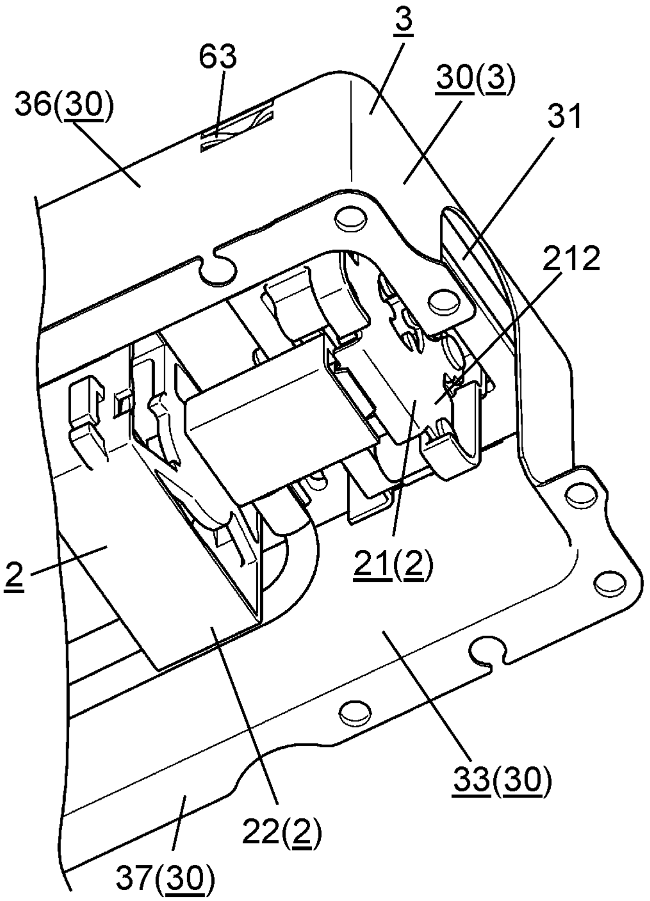
FIG. 14A is a perspective view of a case side of an effective component generation device according to a second exemplary embodiment.
Figure 14B:
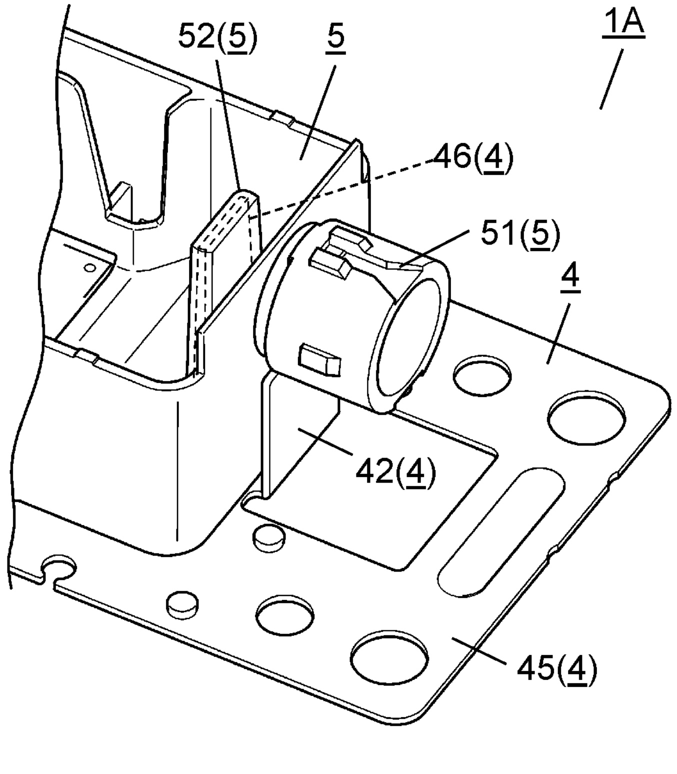
FIG. 14B is a perspective view of the effective component generation device on a lid body side.

As illustrated in FIGS. 14A and 14B, shield wall 46 provided on lid body 4 is inserted into a space between discharger 21 and discharge port 31 when lid body 4 and case 3 are combined.

Case 3 has discharge port 31 formed to discharge the effective component generated in discharger 21 to the outside of case 3. Shield wall 46 is disposed at a position corresponding to discharge port 31 in case 3. As a result, shield wall 46 shields electromagnetic noise generated in discharger 21 and the like. As a result, shield wall 46 reduces emission of the electromagnetic noise to the outside of case 3 through discharge port 31.

Shield wall 46 is made of a conductive metal sheet such as SECC.

Figure 15A:
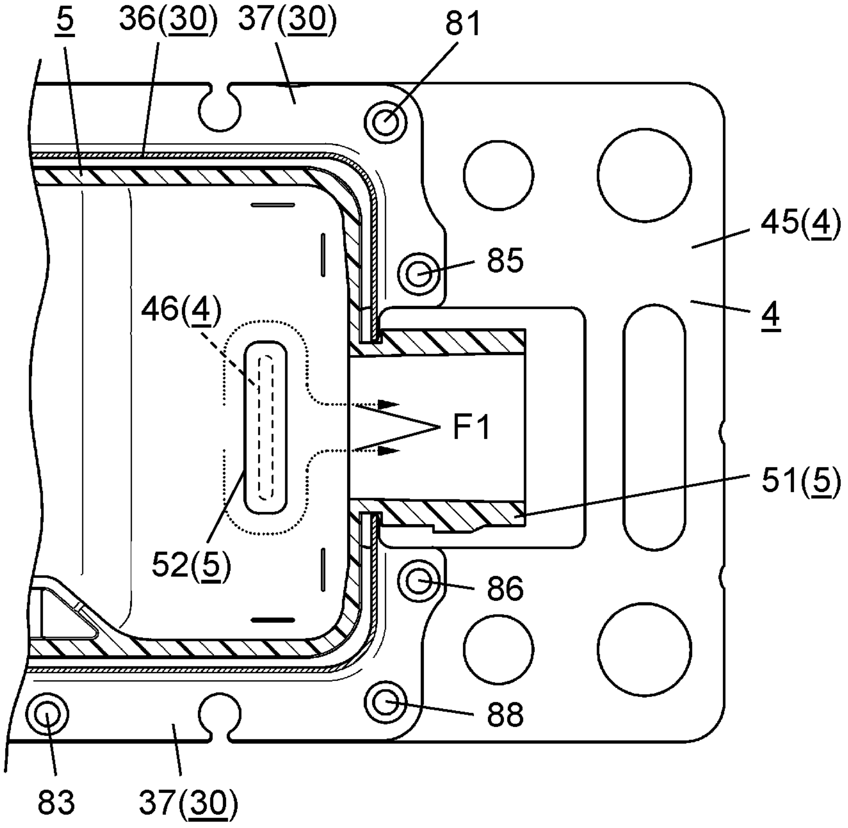
FIG. 15A is a perspective view illustrating a main part of the effective component generation device in a partially broken state.
Figure 15B:
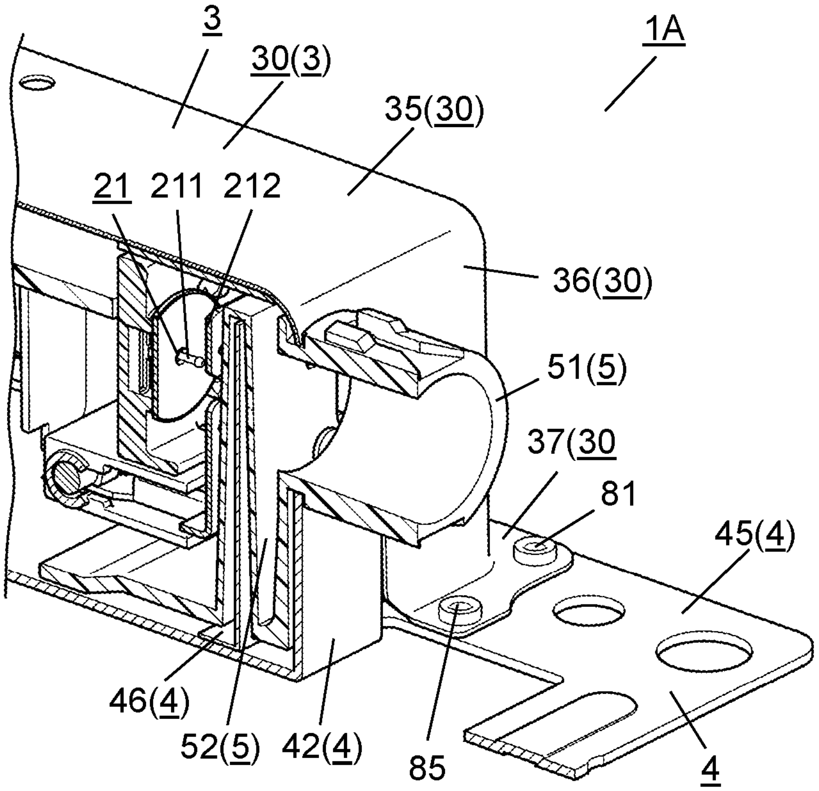
FIG. 15B is a plan view illustrating the main part of the effective component generation device in a partially broken state.

As illustrated in FIG. 15B, shield wall 46 is formed in a substantially L shape (including an L shape), and one side (short side) thereof is joined to lid body 4. Therefore, the other side (long side) of shield wall 46 extends substantially perpendicularly (including perpendicularly) to lid body 4. Shield wall 46 is electrically connected to lid body 4 and case 3 (metal body 30) by being joined to lid body 4. At this time, metal body 30 is electrically connected to a reference potential point (ground) of drive circuit 23. Therefore, shield wall 46 is electrically connected to the reference potential point of drive circuit 23 via lid body 4 and metal body 30.

Further, shield wall 46 is covered with electrically insulating protective member 52 such as PBT. In the second exemplary embodiment, the entire circumference (including the apex portion) of shield wall 46 in plan view is covered with protective member 52. As a result, even when the effective component generated in discharger 21 is charged, the charged effective component is less likely to be adsorbed to shield wall 46. Therefore, as illustrated in FIG. 15A, the effective component generated in discharger 21 is carried on air flow F1 bypassing shield wall 46 and protective member 52. Then, the carried component is smoothly discharged from nozzle 51 disposed in discharge port 31 of case 3 to the outside of case 3 without being adsorbed to shield wall 46.

In the second exemplary embodiment, as illustrated in FIG. 15B, protective member 52 is formed integrally with air passage member 5. That is, air passage member 5 is molded integrally with nozzle 51 and protective member 52. Therefore, even if protective member 52 is provided, an increase in a number of parts can be suppressed.

In the second exemplary embodiment, a configuration in which an electric connection between the reference potential point of drive circuit 23 and shield wall 46 is achieved by the bonding between lid body 4 and shield wall 46 has been described as an example, but the present disclosure is not limited thereto. For example, the reference potential point of drive circuit 23 and shield wall 46 may be connected by a member such as a lead wire, a harness, or a screw to achieve electrical connection between the reference potential point of drive circuit 23 and shield wall 46.

In the second exemplary embodiment, protective member 52 is integrally formed with air passage member 5 as an example, but the present disclosure is not limited to the first exemplary embodiment. Protective member 52 may be achieved by, for example, an electrically insulating tape (insulating tape) covering shield wall 46 or an electrically insulating coating film. Further, shield wall 46 and air passage member 5 may be integrally formed by insert molding air passage member 5 with shield wall 46 as an insert product. As a result, effects such as improvement in assemblability can be obtained.

In addition, the various configurations described in the second exemplary embodiment may be appropriately combined with the various configurations described in the first exemplary embodiment to constitute an effective component generation device.

CONCLUSION

As described above, effective component generation device (1, 1A) of the present disclosure includes internal components (2), case (3), and air passage member (5). Internal components (2) include discharger (21) that generates an effective component. Case (3) is formed in a box shape having discharge port (31) through which an effective component is discharged, and houses internal components (2). Air passage member (5) is housed in case (3) and surrounds discharger (21). Internal components (2) further include air blower (22). Air blower (22) generates air flow (F1) that outputs an effective component to the outside of case (3) through discharge port (31). Air passage member (5) integrally includes upstream block (53) and downstream block (54) that are integrally formed. Upstream block (53) forms air supply passage (R1) on an upstream side as viewed from air blower (22). Downstream block (54) forms air discharge passage (R2) on a downstream side as viewed from air blower (22). Air passage member (5) includes air supply passage (R1) and air discharge passage (R2) in case (3), and forms air passage (R10) through which air flow (F1) passes.

According to this configuration, air passage member (5) forms, in case (3), air passage (R10) including air supply passage (R1) that is on the upstream side as viewed from air blower (22) and air discharge passage (R2) that is on the downstream side as viewed from air blower (22). Air passage member (5) further includes upstream block (53) forming air supply passage (R1) and downstream block (54) forming air discharge passage (R2), which are integrally formed. With such a configuration, in an inner space of case (3), a flow of air flow (F1) is controlled by air passage member (5) on both an upstream side and a downstream side of air blower (22). Therefore, a loss of air flow (F1) that outputs the effective component to the outside of case (3) hardly occurs in case (3). As a result, air flow (F1) that outputs the effective component to the outside of case (3) can be efficiently generated.

In effective component generation device (1, 1A) of the present disclosure, upstream block (53) and downstream block (54) are integrally molded.

According to this configuration, upstream block (53) and downstream block (54) can be seamlessly integrated. Therefore, air supply passage (R1) and air discharge passage (R2) can be smoothly connected to each other.

Effective component generation device (1, 1A) of the present disclosure is configured such that air supply passage (R1) connects between air supply port (32) formed in case (3) and air blower (22).

According to this configuration, air taken into case (3) from air supply port (32) can be efficiently sent to air blower (22).

Effective component generation device (1, 1A) of the present disclosure is configured such that air discharge passage (R2) connects between air blower (22) and discharge port (31).

According to this configuration, the air from air blower (22) can be efficiently sent to discharge port (31).

In effective component generation device (1, 1A) of the present disclosure, air passage member (5) is integrally formed with nozzle (51). Nozzle (51) is disposed in discharge port (31).

According to this configuration, the effective component discharged from discharge port (31) can be smoothly discharged through nozzle (51).

In effective component generation device (1, 1A) of the present disclosure, air passage member (5) forms sound attenuating chamber (59) housing discharger (21). Sound attenuating chamber (59) is configured to reduce a discharge sound generated in discharger (21) by utilizing a resonance phenomenon when the effective component is generated.

According to this configuration, the discharge sound generated in discharger (21) can effectively be reduced.

Effective component generation device (1, 1A) according to the present disclosure is configured such that, in sound attenuating chamber (59), distance D1 between a pair of wall surfaces (591, 592) disposed opposite to each other with discharger (21) interposed therebetween is expressed by $D1 \approx (1/4+n/2) \times \lambda$, where) is a wavelength of a discharge sound and n is an integer.

According to this configuration, the discharge sound generated in discharger (21) can effectively be reduced.

In effective component generation device (1, 1A) of the present disclosure, the pair of wall surfaces (591, 592) is disposed so as to face each other in the flowing direction of air flow (F1).

According to this configuration, the discharge sound generated in discharger (21) can effectively be reduced.

Effective component generation device (1, 1A) of the present disclosure further includes sound attenuating member (48). Sound attenuating member (48) is disposed at a position facing discharger (21), the position being surrounded by air passage member (5).

According to this configuration, the discharge sound generated in discharger (21) can be further reduced.

In effective component generation device (1, 1A) of the present disclosure, air passage member (5) further includes partition wall (582). Partition wall (582) is configured to separate at least one heat generating component included in internal components (2) from at least a part of air passage (R10).

According to this configuration, the influence of heat generated by the heat generating component on air flow (F1) passing through air passage (R10) can be suppressed.

In effective component generation device (1, 1A) of the present disclosure, internal components (2) further include drive circuit (23) that drives discharger (21). Air passage member (5) further includes board-side partition wall (581). Board-side partition (581) is configured to separate circuit board (230) included in drive circuit (23) from at least a part of air passage (R10).

According to this configuration, the influence of heat generated in circuit board (230) on air flow (F1) passing through air passage (R10) can be suppressed.

Effective component generation device (1, 1A) of the present disclosure further includes lid body (4) joined to case (3). Case (3) has opening (33) formed at a position different from discharge port (31). Lid body (4) is joined to case (3) so as to close opening (33) in a state where internal components (2) are housed between lid body (4) and case (3). Air passage member (5) is fixed to lid body (4).

According to this configuration, air passage member (5) can be handled together with lid body (4). Therefore, for example, it is possible to prevent air passage member (5) from being left unassembled.

In effective component generation device (1, 1A) of the present disclosure, air passage member (5) further includes wire passing portion (57). Wire passing portion (57) holds an electric wire electrically connected to internal components (2), and is disposed to an outside of air passage (R10).

According to this configuration, the influence of the heat generated by the electric wire on air flow (F1) passing through air passage (R10) can be suppressed.

The above configuration of the present disclosure is not essential for effective component generation device (1, 1A), and can be omitted as appropriate. Accordingly, it is possible to provide appropriate effective component generation device (1, 1A) according to the application and the like.

INDUSTRIAL APPLICABILITY

The effective component generation device of the present disclosure can be applied to various applications such as a refrigerator, a washing machine, a dryer, an air conditioner, an electric fan, an air purifier, a humidifier, a facial treatment device, and an automobile in which efficient generation of an effective component is desired.

REFERENCE MARKS IN THE DRAWINGS

1, 1A: effective component generation device
2: internal component
3: case
4: lid body
5: air passage member
21: discharger
22: air blower
23: drive circuit
24: liquid supply unit
25: transformer (heat generating component)
26: harness (electric wire)
27: connector
30: metal body
31: discharge port
32: air supply port
33: opening
34: connector port
35: bottom plate
36: peripheral wall
37: flange
41: buffer
42: first closing piece
43: second closing piece
44: rib
45: overhanging portion
46: shield wall
47: caulking hole
48: sound attenuating member
50: introduction port
51: nozzle
52: protective member
53: upstream block
54: downstream block
55: caulked portion
56: coupling portion
57: wire passing portion
59: sound attenuating chamber
61: fixing portion
62: support portion
63: restriction portion
71: screw
72: nut
80: tenth joint
81: first joint (corner joint)
82: second joint (corner joint)
83: third joint
84: fourth joint
85: fifth joint
86: sixth joint
87: seventh joint (corner joint)
88: eighth joint (corner joint)
89: ninth joint portion
211: discharge electrode
211*a*: distal end
212: counter electrode
212*a*: through-hole
212*b*: projecting electrode portion
213: holding block
230: circuit board
231: conductive pad
251: coiled portion
252: connection terminal
301: seamless portion
310: bottom surface
541: cutout
571, 572: wall
581: board-side partition wall
582: partition wall
583: recess
584: dowel
591, 592: wall surface
621: connecting portion
L1: first straight line
L2: second straight line
R1: air supply passage
R2: air discharge passage
R10: air passage

The invention claimed is:

1. An effective component generation device comprising:

an internal device including a discharger that generates an effective component;

a case having a box shape having a discharge port through which the effective component is discharged, the case housing the internal device; and an air passage member that is housed in the case and surrounds the discharger, wherein:

the internal device further includes an air blower that generates an air flow for outputting the effective component from the discharge port to an outside of the case, and the air passage member includes an upstream block forming an air supply passage on an upstream side as viewed from the air blower, and a downstream block forming an air discharge passage on a downstream side as viewed from the air blower, the upstream block and downstream block are integrally formed, the air supply passage and the air discharge passage are located in the case to form an air passage through which the air flow passes, the air passage member forms a sound attenuating chamber housing the discharger, the sound attenuating chamber is configured to reduce a discharge sound generated in the discharger by using a resonance phenomenon when the effective component is generated, and a distance D1 between a pair of wall surfaces provided in the sound attenuating chamber so as to face each other with the discharger interposed therebetween is expressed by using a wavelength λ of the discharge sound and an integer n, as $D1 \approx (1/4+n/2) \times \lambda$.

2. The effective component generation device according to claim 1, wherein the upstream block and the downstream block are integrally molded.

3. The effective component generation device according to claim 1, wherein the air supply passage connects between an air supply port formed in the case and the air blower.

4. The effective component generation device according to claim 1, wherein the air discharge passage connects between the air blower and the discharge port.

5. The effective component generation device according to claim 1, wherein the air passage member is formed integrally with a nozzle, and the nozzle is disposed in the discharge port.

6. The effective component generation device according to claim 1, wherein the pair of wall surfaces is disposed to face each other in a flowing direction of the air flow.

7. The effective component generation device according to claim 1, further comprising a sound attenuating member disposed at a position facing the discharger at a position surrounded by the air passage member.

8. The effective component generation device according to claim 1, wherein the air passage member further includes a partition wall that separates at least one heat generating component included in the internal device from at least a part of the air passage.

9. The effective component generation device according to claim 1, wherein:

the internal device further includes a drive circuit that drives the discharger, and the air passage member further includes a board-side partition wall that separates a circuit board included in the drive circuit from at least a part of the air passage.

10. The effective component generation device according to claim 1, further comprising a lid body joined to the case, wherein;

the case has an opening formed at a position different from the discharge port, the lid body is joined to the case so as to close the opening in a state where the internal device is housed between the lid body and the case, and the air passage member is fixed to the lid body.

11. The effective component generation device according to claim 1, wherein the air passage member holds an electric wire electrically connected to the internal device, and further includes a wire passing portion disposed to the outside the air passage.

* * * * *